United States Patent
Shimokawa et al.

(10) Patent No.: US 9,558,884 B2
(45) Date of Patent: Jan. 31, 2017

(54) POWER TRANSMISSION APPARATUS

(71) Applicant: FUJITSU LIMITED, Kawasaki-shi, Kanagawa (JP)

(72) Inventors: Satoshi Shimokawa, Kawasaki (JP); Akiyoshi Uchida, Akashi (JP); Hiroyasu Kawano, Ebina (JP); Kiyoto Matsui, Miki (JP); Masakazu Taguchi, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 359 days.

(21) Appl. No.: 14/182,501

(22) Filed: Feb. 18, 2014

(65) Prior Publication Data

US 2014/0159502 A1 Jun. 12, 2014

Related U.S. Application Data

(63) Continuation of application No. PCT/JP2012/072256, filed on Aug. 31, 2012, which is a continuation of
(Continued)

(51) Int. Cl.
*H02J 17/00* (2006.01)
*H01F 38/14* (2006.01)
(Continued)

(52) U.S. Cl.
CPC ............ *H01F 38/14* (2013.01); *H02J 5/005* (2013.01); *H02J 7/025* (2013.01); *H02J 17/00* (2013.01);
(Continued)

(58) Field of Classification Search
CPC ............ H01F 38/14; H02J 5/005; H02J 17/00; H02J 7/025; H02J 50/12; H02J 50/50; H02J 50/80; H02J 50/20; H04B 5/0037; H04B 5/0075; H04B 5/0087
See application file for complete search history.

(56) References Cited

U.S. PATENT DOCUMENTS

| | | | | |
|---|---|---|---|---|
| 8,169,185 B2* | 5/2012 | Partovi | ............ | H01F 5/003 320/108 |
| 8,922,064 B2* | 12/2014 | Gotani | ............ | H01F 38/14 307/104 |

(Continued)

FOREIGN PATENT DOCUMENTS

| | | |
|---|---|---|
| CN | 101272063 | 9/2008 |
| JP | 2006-510101 | 3/2006 |

(Continued)

OTHER PUBLICATIONS

CNOA—Office Action mailed on Jun. 2, 2015 issued with respect to the corresponding Chinese Patent Application No. 201280041700.4, with full English translation.

(Continued)

*Primary Examiner* — Ryan Johnson
(74) *Attorney, Agent, or Firm* — Fujitsu Patent Center

(57) ABSTRACT

A power transmission apparatus includes a cover part attached to one of a power transmitter and an electronic apparatus, the power transmitter including a primary-side coil connected to an alternating-current power supply and a primary-side resonant coil configured to receive power from the primary-side coil by electromagnetic induction, the electronic apparatus including a secondary-side coil; and a secondary-side resonant coil disposed in the cover part, and configured to transmit to the secondary-side coil the power received from the primary-side resonant coil by magnetic field resonance generated between the primary-side resonant coil and the secondary-side resonant coil.

9 Claims, 19 Drawing Sheets

Related U.S. Application Data application No. PCT/JP2011/070072, filed on Sep. 2, 2011.

(51) Int. Cl.
*H02J 5/00* (2016.01)
*H02J 7/02* (2016.01)

(52) U.S. Cl.
CPC ............ *H02J 50/12* (2016.02); *H02J 50/50* (2016.02); *H02J 50/80* (2016.02)

(56) References Cited

U.S. PATENT DOCUMENTS

| | | | |
|---|---|---|---|
| 9,054,542 B2* | 6/2015 | Baarman | H02J 5/005 |
| 2006/0205381 A1 | 9/2006 | Beart et al. | |
| 2008/0184281 A1 | 7/2008 | Ashizaki et al. | |
| 2008/0231120 A1 | 9/2008 | Jin | |
| 2009/0179502 A1 | 7/2009 | Cook et al. | |
| 2010/0045114 A1* | 2/2010 | Sample | H02J 5/005 307/104 |
| 2010/0277120 A1 | 11/2010 | Cook et al. | |
| 2011/0175455 A1 | 7/2011 | Hashiguchi | |
| 2011/0176251 A1 | 7/2011 | Lee | |
| 2011/0210696 A1 | 9/2011 | Inoue | |
| 2012/0001485 A1 | 1/2012 | Uchida | |
| 2013/0038135 A1 | 2/2013 | Ichikawa | |
| 2015/0091379 A1 | 4/2015 | Uchida | |

FOREIGN PATENT DOCUMENTS

| | | |
|---|---|---|
| JP | 2007-221419 | 8/2007 |
| JP | 2008-207875 | 9/2008 |
| JP | 2009-240099 | 10/2009 |
| JP | 2010-263690 | 11/2010 |
| JP | 2010-268665 | 11/2010 |
| JP | 2011-135754 | 7/2011 |
| JP | 2011-147280 | 7/2011 |
| JP | 2011-151946 | 8/2011 |
| JP | 2011-160600 | 8/2011 |
| JP | 2011-160634 | 8/2011 |
| JP | 2012-190574 | 10/2012 |
| KR | 10-2010-0031139 | 3/2010 |
| WO | 2010/116441 | 10/2010 |
| WO | WO2011074082 | 6/2011 |

OTHER PUBLICATIONS

KROA—Office Action dated Jul. 8, 2015 issued for Korean Patent Application No. 10-2014-7005317, with English translation.

EESR—Extended European Search Report dated Sep. 22, 2015 issued with respect to the corresponding European Patent Application No. 12827200.2.

JPOA—Office Action mailed on Jan. 6, 2015 issued with respect to the corresponding Japanese Patent Application No. 2013-531442, with partial English translation.

International Search Report, mailed in connection with PCT/JP2012/072256 and mailed Oct. 23, 2012.

Karalis, Aristeidis et al., "Efficient wireless non-radiative mid-range energy transfer", Center for Materials Science and Engineering and Research Laboratory of Electronics, Massachusetts Institute of Technology, (http://arxiv.org/ftp/physics/papers/0611/0611063.pdf), the Internet search conducted on Jul. 4, 2011.

KROA—Korean Office Action mailed on Jan. 22, 2016 issued with respect to the corresponding Korean Patent Application No. 10-2014-7005317, with full English translation.

CNOA—Notification of the Second Office Action issued on Feb. 3, 2016 for Chinese Patent Application No. 201280041700.4, with full English translation.

\* cited by examiner

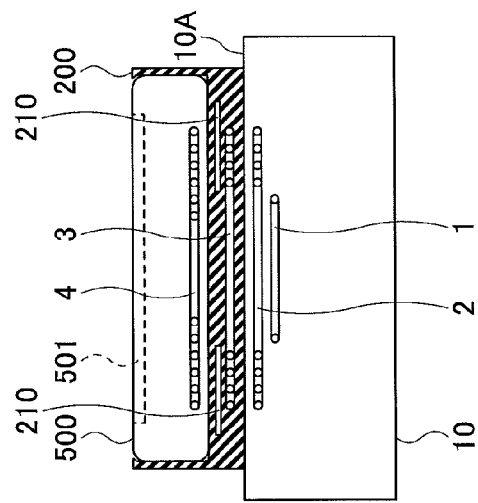
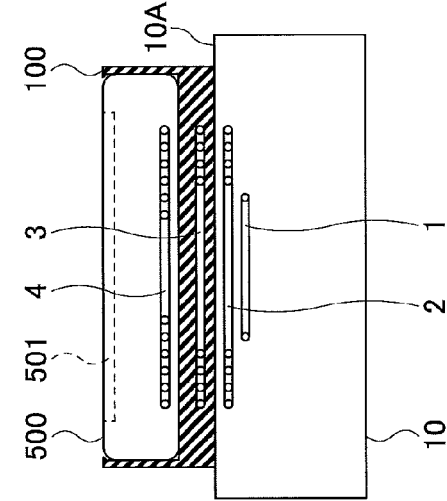
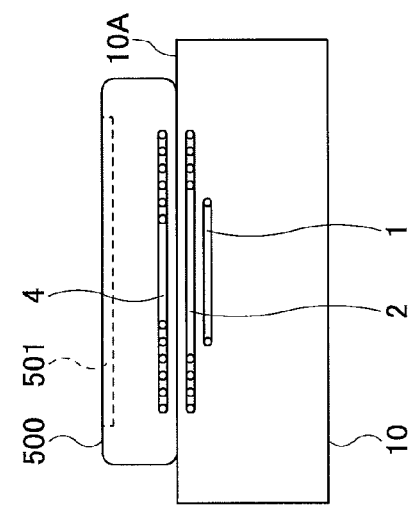

POWER TRANSMISSION APPARATUS

CROSS-REFERENCE TO RELATED APPLICATIONS

This application is a continuation application of International Application PCT/JP2012/072256 filed on Aug. 31, 2012, which is a continuation application of International Application PCT/JP2011/070072 filed on Sep. 2, 2011, and designates the U.S., the entire contents of each of which are incorporated herein by reference.

FIELD

The disclosures discussed herein relate to a power transmission apparatus.

BACKGROUND

There is disclosed in the related art a noncontact power transmitting apparatus having a coil unit in which an electromagnetic induction coil is disposed closer to a counterpart coil unit that faces the coil unit than a self-resonant coil in a power transmitting device and/or a power receiving device, such that the noncontact power transmitting apparatus switches between different power supply methods according to a type of the counterpart coil unit so as to implement noncontact power supply. Such a noncontact power transmitting apparatus may be capable of supplying power based on magnetic field resonance or electromagnetic induction (e.g., see Patent Document 1).

Further, there is also disclosed in the related art a wireless power receiving apparatus that may be attached later to a mobile electronic device so as to receive power wirelessly. Such a wireless power receiving apparatus may, for example, be attached to a mobile electronic device with adhesive, and include a power receiving element to receive power from a power transmitter by electromagnetic induction when the wireless power receiving apparatus approaches the power transmitter. In the wireless power receiving apparatus, one or more power connectors may electrically be connected to the power receiving element when the wireless power receiving apparatus is activated. Further, such one or more connectors may be connected to one or more counterpart connectors of the mobile electronic device in order to supply power received from the power receiving element to the mobile electronic device (e.g., see Patent Document 2).

RELATED ART DOCUMENTS

Patent Document

Patent Document 1: Japanese Laid-open Patent Publication No. 2010-268665
Patent Document 2: Japanese National Publication of International Patent Application No. 2006-510101

The related art noncontact power transmitting apparatus is configured to switch between an electromagnetic induction coil and a self-resonant coil on a power transmitting side, based on which one of a magnetic field resonance type power supply system and an electromagnetic induction type power supply system is used on a power receiving side. Hence, the related art non-contact power transmitting apparatus having the above configuration may need to have a switching device for switching between the different types of coils, which may prevent the non-contact power transmitting apparatus from having a simpler configuration, and may also prevent the non-contact power transmitting apparatus from supplying power to the power receiving side.

Further, the related art wireless power receiving apparatus may need to be connected to a power source connector of the mobile electronic device in order to supply power to the mobile electronic device. Hence, power supply between the wireless power receiving apparatus and the mobile electronic device is not implemented by wireless communication but is implemented by wired communication, which may prevent the wireless power receiving apparatus from having a simpler configuration, and may also prevent the wireless power receiving apparatus from supplying power to the mobile electronic device. Moreover, when a power supply system employed in the wireless power receiving apparatus is an electromagnetic induction type, the power transmitter and the wireless power receiving apparatus may need to be disposed closer to each other to supply power from the power transmitter to the wireless power receiving apparatus when the power transmitter on the power transmitting side is not aligned with the wireless power receiving apparatus on the power receiving side.

As described above, the wireless power transmission system includes the electromagnetic induction type employed by the related art noncontact power transmitting apparatus and the magnetic field resonance type employed in the related art wireless power receiving apparatus.

The basic principle of the electromagnetic induction type power transmitting system is well known in the art and has already been put into practical use. Hence, the electromagnetic induction type power transmitting system is expected to become widely used earlier than the magnetic field resonance type power transmitting system.

Further, it is expected that the electronic device employing electromagnetic induction type power transmitting system will continue to be used for a while even after the magnetic field resonance type power transmitting system has become popular.

Hence, it is expected that there will be a need for a power transmission apparatus having a simpler configuration and capable of transmitting power from the magnetic field resonance type power transmitter to the electromagnetic induction type electronic device.

SUMMARY

According to an aspect of an embodiment, there is provided a power transmission apparatus that includes a cover part attached to one of a power transmitter and an electronic apparatus, the power transmitter including a primary-side coil connected to an alternating-current power supply and a primary-side resonant coil configured to receive power from the primary-side coil by electromagnetic induction, the electronic apparatus including a secondary-side coil; and a secondary-side resonant coil disposed in the cover part, and configured to transmit to the secondary-side coil the power received from the primary-side resonant coil by magnetic field resonance generated between the primary-side resonant coil and the secondary-side resonant coil.

The object and advantages of the invention will be realized and attained by means of the elements and combinations particularly pointed out in the appended claims.

It is to be understood that both the foregoing general description and the following detailed description are exemplary and explanatory and are not restrictive of the invention as claimed.

BRIEF DESCRIPTION OF DRAWINGS

FIGS. 26A, 26B, and 26C are cross-sectional diagrams each illustrating a state in which power is transmitted from the power transmitter 10 to the smartphone 500;

DESCRIPTION OF EMBODIMENTS

In the following, a description is given, with reference to the accompanying drawings, of a power transmission apparatus to which preferred embodiments of the present invention are applied.

First Embodiment

Figure 1:
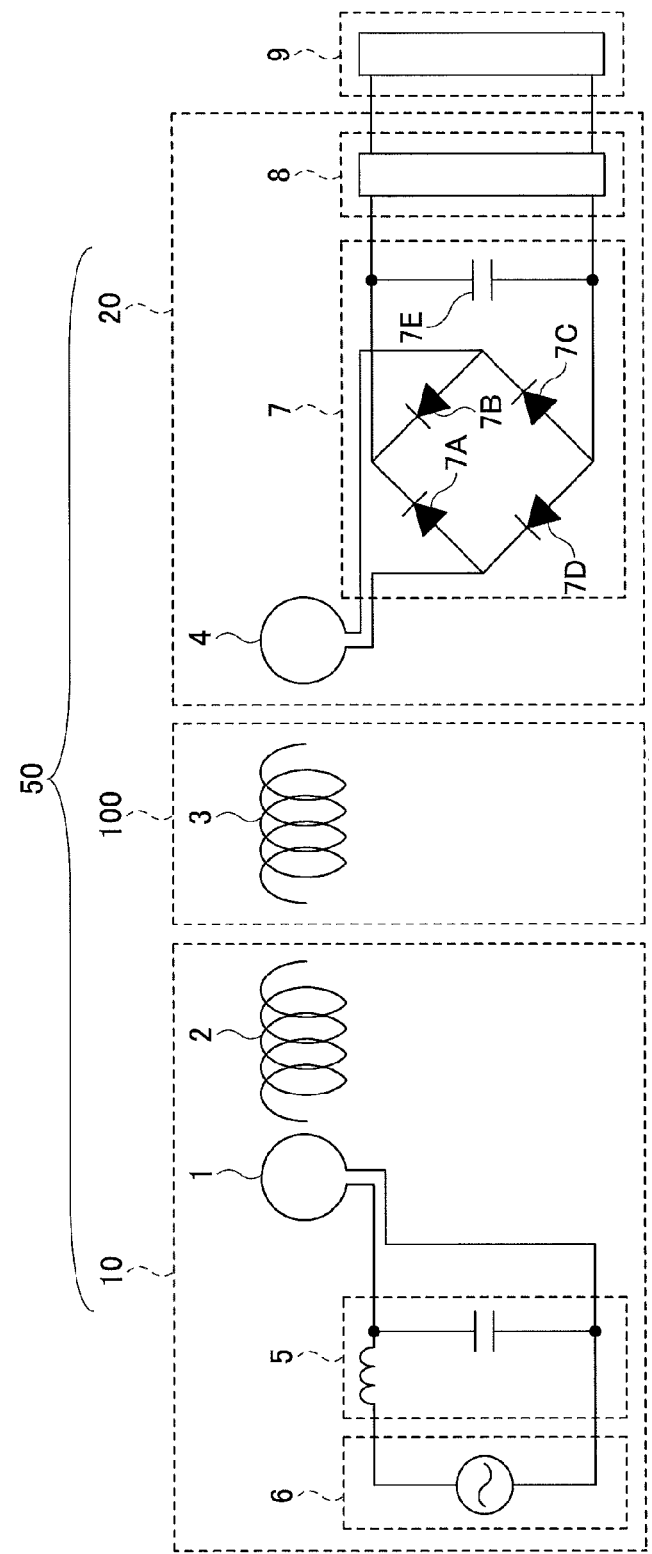
FIG. 1 is a diagram illustrating a configuration of a charging system including a power transmission apparatus utilizing magnetic field resonance.
Figure 2:
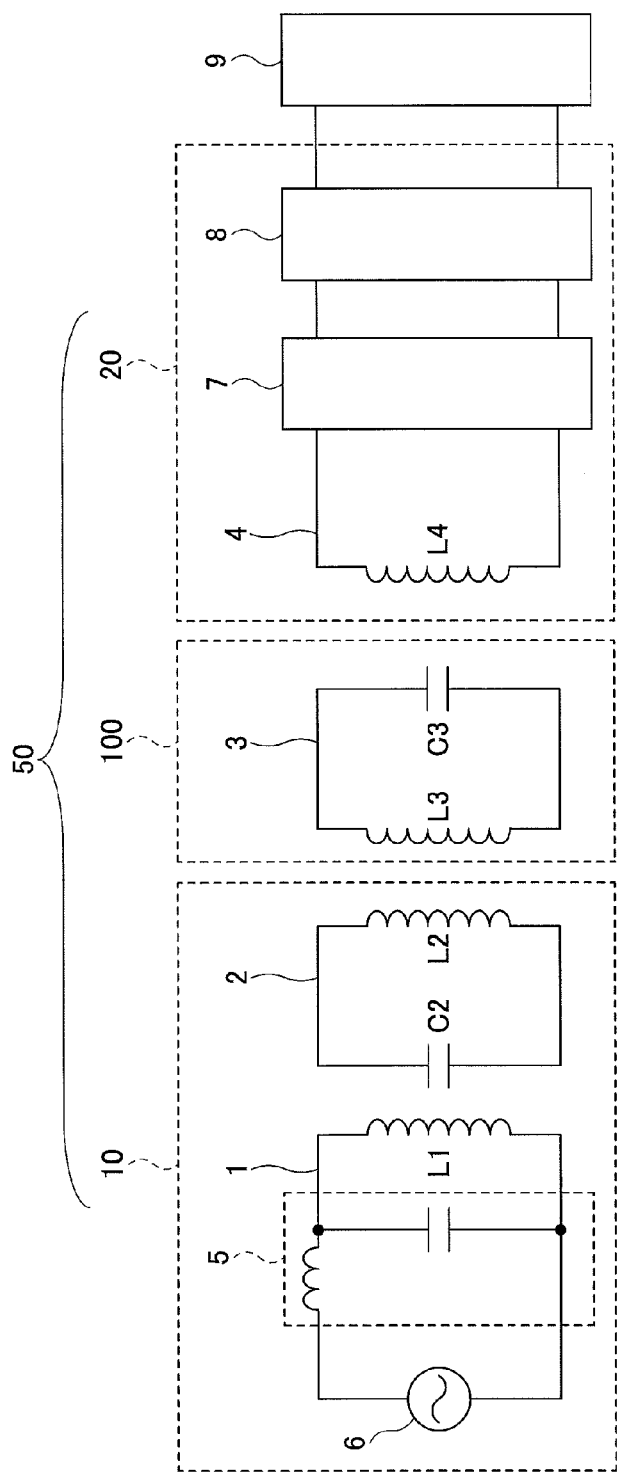
FIG. 2 is a diagram illustrating an equivalent circuit of the charging system illustrated in FIG. 1.

FIG. 1 is a diagram illustrating a configuration of a charging system including a power transmission apparatus that employs magnetic-field resonance, and FIG. 2 is a diagram illustrating an equivalent circuit of the charging system illustrated in FIG. 1.

As illustrated in FIG. 1, the charging system 50 including a power transmission apparatus 100 of a first embodiment includes a primary-side coil 1, a primary-side resonant coil 2, a secondary-side resonant coil 3, a secondary-side coil 4, a matching circuit 5, an alternating-current (AC) power supply 6, a rectifier circuit 7, and a DC-DC converter 8. The charging system 50 is connected to a battery 9.

The primary-side coil 1, the primary-side resonant coil 2, the matching circuit 5, and the AC power supply 6 are included in a power transmitter 10 configured to transmit electric power.

The secondary-side resonant coil 3 is included in the power transmission apparatus 100. The power transmission apparatus 100 is disposed between the power transmitter 10 and a power receiver 20, and is configured to relay electric power (hereinafter simply called "power") received from the power transmitter 10 and transmit the received power to the power receiver 20.

The secondary-side coil 4, the rectifier circuit 7, and the DC-DC converter 8 are included in the power receiver 20. The power receiver 20 is connected to the battery 9.

Initially, a description is given of the primary-side coil 1, the primary-side resonant coil 2, the matching circuit 5, and the AC power supply 6 that are included in the power transmitter 10.

As illustrated in FIG. 1, the primary-side coil 1 is a loop-shaped coil, and is connected to the AC power supply 6 via the matching circuit 5 between two ends of the primary-side coil 1. The primary-side coil 1 is disposed close to but not in contact with the primary-side resonant coil 2 such that the primary-side coil 1 is electromagnetically coupled with the primary-side resonant coil 2. The primary-side coil 1 is disposed such that the central axis of the primary-side coil 1 matches the central axis of the primary-side resonant coil 2. This is because by matching the central axis of the primary-side coil 1 and the central axis of the primary-side resonant coil 2, it may be possible to suppress leakage of magnetic flux and generation of magnetic fields in the vicinities of the primary-side coil 1 and the primary-side resonant coil 2 as well as improving the coupling strength between the primary-side coil 1 and the primary-side resonant coil 2.

Further, as illustrated in an equivalent circuit of FIG. 2, the primary-side coil 1 may be depicted as an inductance L1 coil. Note that the primary-side coil 1 in practice includes a resistance component and a capacitor component; however, illustration of these components is omitted from FIG. 2.

The primary-side coil 1 generates magnetic fields by alternating-current (AC) power supplied from the AC power supply 6 via the matching circuit 5, and transmits the power to the primary-side resonant coil 2 by electromagnetic induction (mutual induction).

As illustrated in FIG. 1, the primary-side resonant coil 2 is disposed close to but not in contact with the primary-side coil 1 such that the primary-side resonant coil 2 is electro-magnetically coupled with the primary-side coil 1. Further, the primary-side resonant coil 2 has a predetermined resonance frequency and is designed to have a high Q value. The resonance frequency of the primary-side resonant coil 2 is set to be equal to the resonance frequency of the secondary-side resonant coil 3. Note that in FIG. 1, the two ends of the primary-side resonant coil 2 are open for facilitating viewability. However, a capacitor for adjusting the resonance frequency may be connected in series between the two ends of the primary-side resonant coil 2.

The primary-side resonant coil 2 is disposed such that the central axis of the primary-side resonant coil 2 matches the central axis of the secondary-side resonant coil 3 with a predetermined interval. The interval between the primary-side resonant coil 2 and the secondary-side resonant coil 3 may, for example, be several meters. When the resonance Q of the primary-side resonant coil 2 and the secondary-side resonant coil 3 is sufficiently high, the power may be transmitted by magnetic field resonance despite the fact that the distance between the primary-side resonant coil 2 and the secondary-side resonant coil 3 is several meters. Note that the central axis of the primary-side resonant coil 2 and the central axis of the secondary-side resonant coil 3 are matched so that a high magnetic field resonance may be generated between the primary-side resonant coil 2 and the secondary-side resonant coil 3.

Further, as illustrated in the equivalent circuit of FIG. 2, the primary-side resonant coil 2 may be depicted as a loop circuit including an inductor having inductance L2 and a capacitor having a capacitance C2. The capacitance C2 represents the capacitance of a capacitor connected between the two ends of the primary-side resonant coil 2 for adjusting frequencies. Note that the primary-side resonant coil 2 in practice includes a resistance component; however, illustration of the resistance component is omitted from FIG. 2.

The resonance frequency of the primary-side resonant coil 2 is set to be identical to the frequency of the AC power output by the AC power supply 6. The resonance frequency of the primary-side resonant coil 2 is determined based on the inductance L2 of the primary-side resonant coil 2 and the capacitance C2. Hence, the inductance L2 of the primary-side resonant coil 2 and the capacitance C2 are set such that the resonance frequency of the primary-side resonant coil 2 is identical to the frequency of the AC power output from the AC power supply 6.

Note that when the resonance frequency is set by the parasitic capacitance alone and the stray capacitance of the primary-side resonant coil 2 is able to be fixed, the two ends of the primary-side resonant coil 2 may be open.

The matching circuit 5 is inserted for matching impedance of the primary-side coil 1 and that of the AC power supply 6, and includes an inductor L and a capacitor C.

The AC power supply 6 serves as a power supply to output AC power of the frequency necessary for the magnetic field resonance, and includes an amplifier to amplify the output power. The AC power supply 6 may, for example, output high frequency AC power from several hundreds kHz to several tens MHz.

The power transmitter 10 including the above-described primary-side coil 1, the primary-side resonant coil 2, the matching circuit 5, and the AC power supply 6 is configured to transmit AC power supplied from the AC power supply 6 to the primary-side coil 1 by magnetic induction, and transmit power from the primary-side resonant coil 2 to the secondary-side resonant coil 3 of the power transmission apparatus 100 by magnetic field resonance.

Next, a description is given of the secondary-side resonant coil 3 included in the power transmission apparatus 100.

As illustrated in FIG. 1, the secondary-side resonant coil 3 included in the power transmission apparatus 100 is disposed such that the central axis of the secondary-side resonant coil 3 matches the central axis of the primary-side resonant coil 2 with a predetermined interval.

In FIG. 1, the two ends of the secondary-side resonant coil 3 are open for facilitating viewability. However, a capacitor for adjusting the resonance frequency may be connected in series between the two ends of the secondary-side resonant coil 3.

The secondary-side resonant coil 3 has a resonance frequency identical to that of the primary-side resonant coil 2, and is designed to have an extremely high Q value.

The interval between the secondary-side resonant coil 3 and the primary-side resonant coil 2 may, for example, be several meters. When the resonance Q of the secondary-side resonant coil 3 and the primary-side resonant coil 2 is sufficiently high, the power may be transmitted by magnetic field resonance despite the fact that the distance between the secondary-side resonant coil 3 and the primary-side resonant coil 2 is several meters.

Further, the secondary-side resonant coil 3 is disposed close to but not in contact with the secondary-side coil 4 such that the secondary-side resonant coil 3 is electromagnetically coupled with the secondary-side coil 4.

Further, as illustrated in the equivalent circuit of FIG. 2, the secondary-side resonant coil 3 may be depicted as the secondary-side resonant coil 3 including an inductor having inductance L3 and a capacitor having a capacitance C3. The capacitance C3 represents the capacitance of a capacitor connected between the two ends of the secondary-side resonant coil 3 for adjusting frequencies. Note that the secondary-side resonant coil 3 in practice includes a resistance component; however, illustration of the resistance component is omitted from FIG. 2.

The resonance frequency of the secondary-side resonant coil 3 is determined based on the inductance L3 of the secondary-side resonant coil 3 and the capacitance C3. Hence, the inductance L3 of the secondary-side resonant coil 3 and the capacitance C3 are set such that the resonance frequency of the secondary-side resonant coil 3 is identical to the resonance frequency of the primary-side resonant coil 2 and the frequency of the AC power output from the AC power supply 6.

Note that when the resonance frequency is set by the parasitic capacitance alone and the stray capacitance of the secondary-side resonant coil 3 is able to be fixed, the two ends of the secondary-side resonant coil 3 may be open.

The power transmission apparatus 100 including the secondary-side resonant coil 3 is configured to receive the power transmitted from the primary-side resonant coil 2 of the transmitter 10 by magnetic field resonance, and transmit the relayed power to the power receiver 20.

Next, a description is given of the secondary-side coil 4, the rectifier circuit 7, and the DC-DC converter 8 that are included in the power receiver 20.

As illustrated in FIG. 1, the secondary-side coil 4 is a loop-shaped coil similar to that serving as the primary-side coil 1. The secondary-side coil 4 is configured to be electromagnetically coupled with the secondary-side resonant coil 3, and the rectifier circuit 7 is connected between two ends of the secondary-side coil 4.

The secondary-side coil 4 is disposed such that the central axis of the secondary-side coil 4 matches the central axis of the secondary-side resonant coil 3. The secondary-side coil 4 is disposed close to but not in contact with the secondary-side resonant coil 3 such that the secondary-side coil 4 is electromagnetically coupled with the secondary-side resonant coil 3. This is because by matching the central axis of the secondary-side resonant coil 3 and the central axis of the secondary-side coil 4, it may be possible to suppress leakage of magnetic flux and generation of magnetic fields in the vicinities of the secondary-side resonant coil 3 and the secondary-side coil 4 as well as improving the coupling strength between the secondary-side resonant coil 3 and the secondary-side coil 4.

Further, as illustrated in the equivalent circuit of FIG. 2, the secondary-side coil 4 may be depicted as an inductance L4 coil. Note that the secondary-side coil 4 in practice includes a resistance component and a capacitor component; however, illustration of these components are omitted from FIG. 2.

The secondary-side coil 4 is configured to receive electric power from the secondary-side resonant coil 3 by electromagnetic induction (mutual induction), and supply the power to the rectifier circuit 7.

The rectifier circuit 7 includes four diodes 7A to 7D, and a capacitor 7E. The diodes 7A to 7D are connected in a bridge-like configuration, and configured to rectify the full wave of the power input from the secondary-side coil 4 and output the full-wave rectified power. The capacitor 7E serves as a smoothing capacitor connected to the output side of the bridge circuit including the diodes 7A to 7D. The capacitor 7E is configured to smooth the power that is full-wave rectified by the bridge circuit including the diodes 7A to 7D, and output the smoothed power as direct-current power.

The DC-DC converter 8 is connected to the output side of the rectifier circuit 7, and is configured to convert the voltage of the direct-current power output from the rectifier circuit 7 into the rated voltage of the battery 9. The DC-DC converter 8 is configured to lower the output voltage of the rectifier circuit 7 to the rated voltage of the battery 9 when the output voltage of the rectifier circuit 7 is higher than the rated voltage of the battery 9. Further, the DC-DC converter 8 is configured to raise the output voltage of the rectifier circuit 7 to the rated voltage of the battery 9 when the output voltage of the rectifier circuit 7 is lower than the rated voltage of the battery 9.

The power receiver 20 including the above-described secondary-side coil 4, the rectifier circuit 7, and the DC-DC converter 8 is configured to convert the AC power transmitted by electromagnetic induction from the secondary-side resonant coil 3 of the power transmission apparatus 100 into direct-current power, and further convert the output voltage of the direct-current power into the rated voltage of the battery 9.

The battery 9 may be any rechargeable secondary battery insofar as the secondary battery may be able to be repeatedly charged. An example of such secondary battery may be a lithium ion battery.

Note that the primary-side coil 1, the primary-side resonant coil 2, the secondary-side resonant coil 3, and the secondary-side coil 4 may be made by winding a copper wire. However, materials for the primary-side coil 1, the primary-side resonant coil 2, the secondary-side resonant coil 3, and the secondary-side coil 4 may be the metal other than copper (e.g., gold, aluminum, etc.). Moreover, materials of the primary-side coil 1, the primary-side resonant coil 2, the secondary-side resonant coil 3, and the secondary-side coil 4 may be different from one another.

In the above-described charging system 50, the primary-side coil 1 and the primary-side resonant coil 2 correspond to a power transmitting side, and the secondary-side resonant coil 3 and the secondary-side coil 4 correspond to a power receiving side.

The charging system 50 serves as a magnetic field resonance system configured to transmit power from the power transmitting side to the power receiving side utilizing magnetic fields generated between the primary-side resonant coil 2 and the secondary-side resonant coil 3. Hence, the charging system 50 may be capable of transmitting power farther than the electromagnetic induction system configured to transmit power from the power transmitting side to the power receiving side.

Further, in FIG. 1, illustration is given of a case in which the central axis of the primary-side resonant coil 2 matches the central axis of the secondary-side resonant coil 3. However, the magnetic field resonance system has an advantage of handling misaligned positions between the coil on the power transmitting side and the coil of the power receiving side electromagnetic induction system better than the electromagnetic induction system.

Hence, the magnetic field resonance system is more flexible than the electromagnetic induction system with respect to a distance or misaligned positions between the resonant coils, and the magnetic field resonance system thus has an advantage called "free-positioning".

Accordingly, the charging system 50 based on the magnetic field resonance system is expected to be used as a non-contact charging system in small-sized electronic apparatuses such as a mobile phone terminal or a smartphone terminal, small-sized home electric appliances, or electric cars.

Next, a description is given of a configuration of the power transmission apparatus 100 of the first embodiment with reference to FIGS. 3, 4, 5, and 6.

Figure 3:
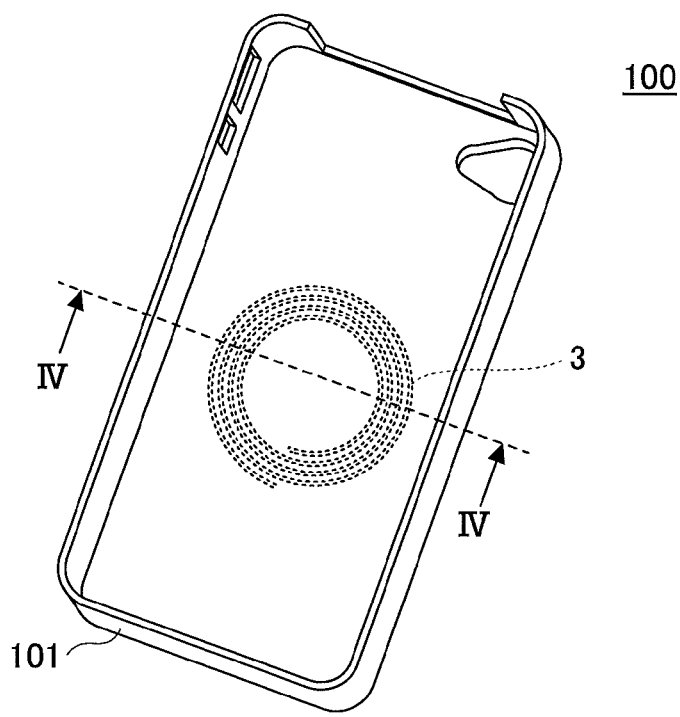
FIG. 3 is a perspective diagram illustrating a power transmission apparatus 100 according to a first embodiment.
Figure 4:
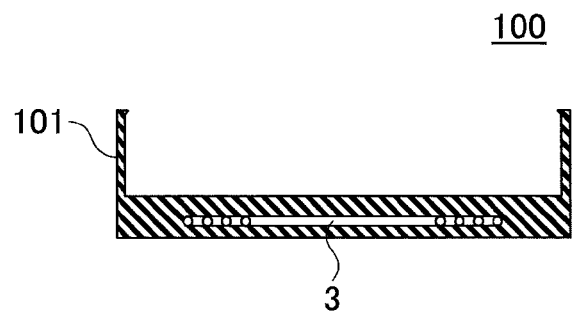
FIG. 4 is a cross-sectional diagram cut along a broken line IV-IV of FIG. 3.

FIG. 3 is a perspective diagram illustrating the power transmission apparatus 100 of the first embodiment, and FIG. 4 is a cross-sectional diagram cut along a broken line IV-IV of FIG. 3. The cross-sectional diagram cut along the broken line IV-IV is a cross section passing through the central axis of the secondary-side resonant coil 3.

The power transmission apparatus 100 of the first embodiment includes a cover part 101 and the secondary-side resonant coil 3.

As illustrated in FIG. 3, the cover part 101 may be molded as a jacket shape of the smartphone terminal. For example, the cover part 101 may be made by insert-molding thermoplastic polycarbonate resin. The secondary-side resonant coil 3 may be encapsulated in the cover part 101 when the cover part 101 is insert-molded with the polycarbonate resin.

The jacket-shaped cover part 101 is engaged with a housing of the smartphone terminal such that the cover part 101 is attached to the smartphone terminal. Dimensions of the cover part 101 may differ according to models of the smartphone terminals; however, the cover part 101 may have a length of approximately 120 mm, a width of approximately 60 mm, and a height of approximately 10 mm. Further, the thickness of the polycarbonate resin may differ according to locations of the cover part 101; however, the polycarbonate resin may have a thickness of approximately 1 mm at the location having no secondary-side resonant coil 3, and may have a thickness of approximately 1.5 mm at the location having the secondary-side resonant coil 3.

The jacket herein is configured to mainly cover parts (e.g., mainly lateral sides and a rear side) of the housing excluding a touch panel of the smartphone terminal in order to protect these parts from being scarred or shocked, or configured to decorate the exterior of the smartphone terminal with various colors, characters, patterns, members, and the like. The jacket may be attached to the housing of the smartphone terminal by being engaged with the housing or with an adhesive agent.

It is preferable that the cover part 101 be made of a nonmagnetic and nonconductive material. Hence, the cover part 101 is made of polycarbonate resin in the first embodiment. The cover part 101 is made of a nonmagnetic material for suppressing turbulence or loss of magnetic flux and for not affecting the resonance performance of the secondary-side resonant coil 3.

Further, the cover part 101 is made of a nonconductive material for suppressing loss of electric power due to eddy current generation when the power transmission apparatus 100 relays the power between the power transmitter 10 and the power receiver 20.

The smartphone terminal to which the power transmission apparatus 100 of the first embodiment is attached includes the secondary-side coil 4 (see FIGS. 1 and 2) on its rear side (i.e., a side opposite to the touch panel), is configured to receive the power from the power transmitter by electromagnetic induction and to charge a built-in battery in a noncontact state with the power transmitter. Details of the smartphone terminal to which the power transmission apparatus 100 of the first embodiment is attached will be described later with reference to FIGS. 4 and 5.

The cover part 101 is attached to the smartphone terminal in order to protect the housing of the smartphone terminal from being scarred or shocked by covering parts excluding the touch panel and its peripherals (mainly lateral sides and a rear side). The cover parts 101 may be transparent, or provided with various colors or decorations.

As illustrated in FIG. 4, the secondary-side resonant coil 3 is incorporated in the cover part 101. The secondary-side resonant coil 3 is incorporated in the cover part 101 at a position where when the power transmission apparatus 100 is attached to the smartphone terminal, the secondary-side resonant coil 3 moves close to the secondary-side coil 4 of the smartphone terminal at a rear side of the smartphone such that the central axis of the secondary-side resonant coil 3 matches the central axis of the secondary-side coil 4. This is because by matching the central axis of the secondary-side resonant coil 3 and the central axis of the secondary-side coil 4, it may be possible to suppress leakage of magnetic flux and generation of magnetic fields in the vicinities of the secondary-side resonant coil 3 and the secondary-side coil 4 as well as improving the coupling strength between the secondary-side resonant coil 3 and the secondary-side coil 4.

Hence, the power transmission apparatus 100 may, for example, be formed to incorporate the secondary-side resonant coil 3 by molding polycarbonate resin in a state where the secondary-side resonant coil 3 is aligned.

Figure 5:
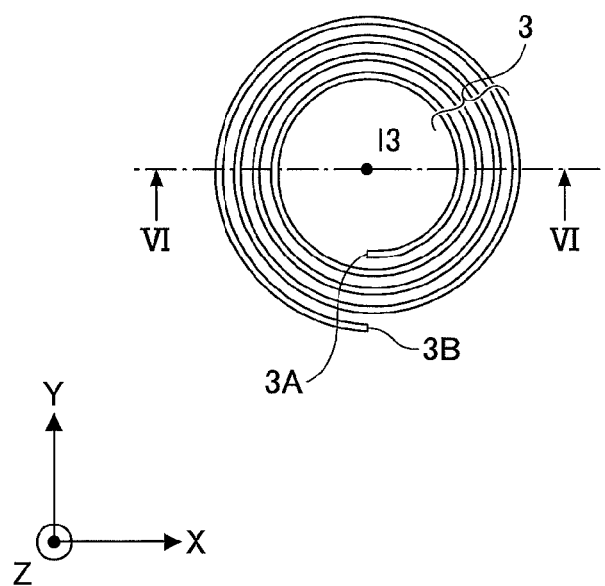
FIG. 5 is a plan diagram illustrating a secondary-side resonant coil 3 of the power transmission apparatus 100 according to the first embodiment.
Figure 6:
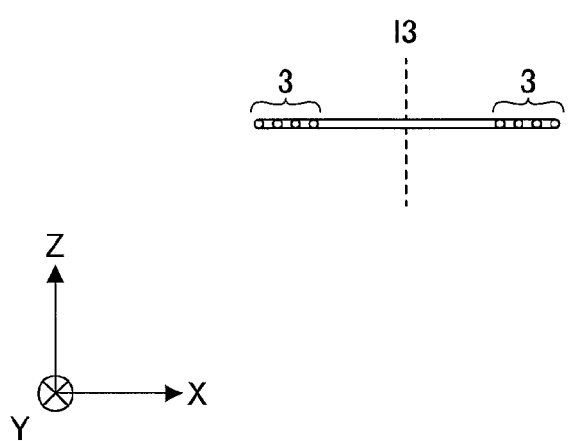
FIG. 6 is a cross-sectional diagram cut along a dash-dot line VI-VI of FIG. 5.

FIG. 5 is a plan diagram illustrating the secondary-side resonant coil 3 of the power transmission apparatus 100 according to the first embodiment, and FIG. 6 is a cross-sectional diagram cut along a dash-dot line VI-VI of FIG. 5. The cross-sectional diagram cut along the dash-dot line VI-VI is a cross section passing through the central axis of the secondary-side resonant coil 3. Note that the X, Y, and Z coordinate system is defined as illustrated in FIGS. 5 and 6.

The secondary-side resonant coil 3 is a planar coil having the number of turns being four, and end parts 3A and 3B of the secondary-side resonant coil 3 are connected to a not-illustrated capacitor. The resonance frequency of the secondary-side resonant coil 3 is adjusted by connecting two ends (i.e., the end parts 3A and 3B) of the secondary-side resonant coil 3 to the not-illustrated capacitor. The equivalent circuit schematic diagram of the secondary-side resonant coil 3 is illustrated in FIG. 2. The capacitance C3 illustrated in FIG. 2 indicates a capacitance of the capacitor connected between the end parts 3A and 3B of the secondary-side resonant coil 3.

Note that when the resonance frequency is set by the parasitic capacitance of the secondary-side resonant coil 3 alone, it may be unnecessary to connect the capacitor for adjusting the resonance frequency between the end parts 3A and 3B of the secondary-side resonant coil 3. In such a case, the end parts 3A and 3B of the secondary-side resonant coil 3 are an open state.

Next, a description is given of the smartphone terminal to which the power transmission apparatus 100 of the first embodiment is attached with reference to FIGS. 7 to 12.

Figure 7:
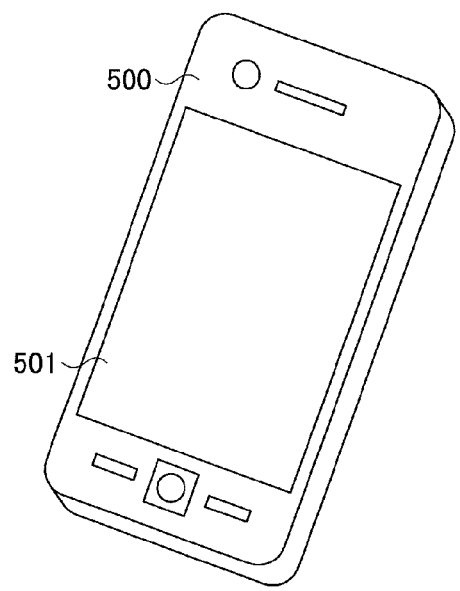
FIG. 7 is a perspective diagram illustrating a front side of a smartphone terminal 500 to which the power transmission apparatus 100 according to the first embodiment is attached.
Figure 8:
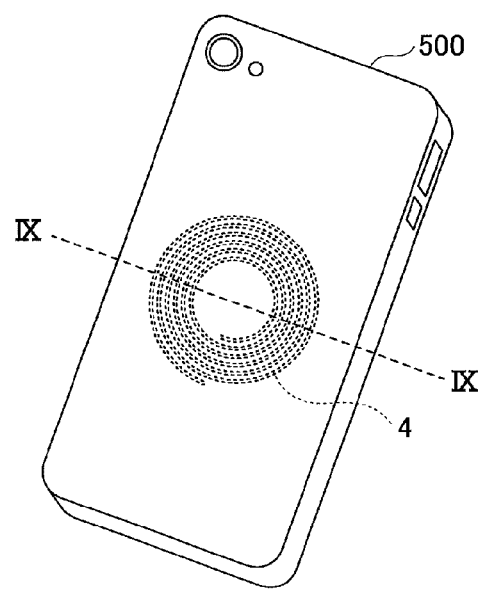
FIG. 8 is a perspective diagram illustrating a rear side of the smartphone terminal 500.
Figure 9:
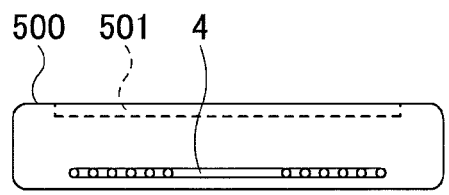
FIG. 9 is a cross-sectional diagram cut along a broken line IX-IX of FIG. 8.
Figure 10:
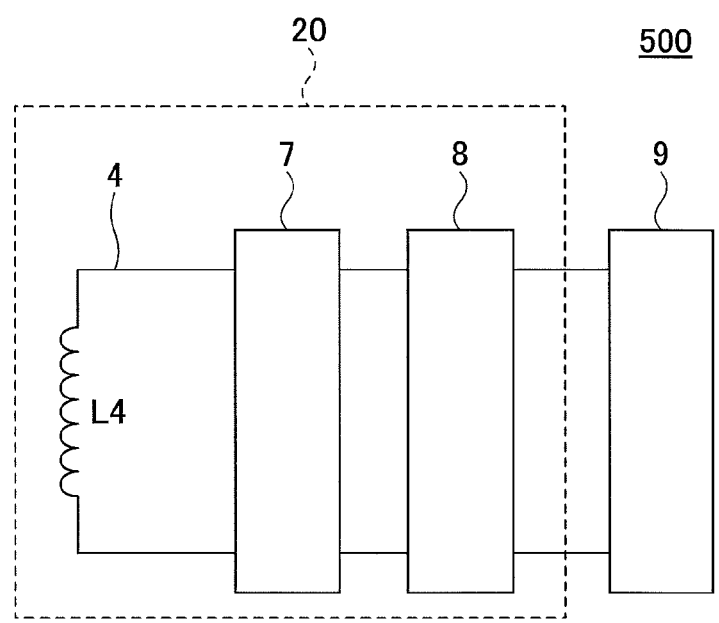
FIG. 10 is a circuit diagram illustrating main elements included in the smartphone terminal 500.

FIG. 7 is a perspective diagram illustrating a front side of a smartphone terminal 500 to which the power transmission apparatus 100 according to the first embodiment is attached, and FIG. 8 is a perspective diagram illustrating a rear side of the smartphone terminal 500. FIG. 9 is a cross-sectional diagram cut along a broken line IX-IX of FIG. 8, and FIG. 10 is a circuit diagram illustrating main elements included in the smartphone terminal 500. The cross-sectional diagram cut along the broken line IX-IX is a cross section passing through the central axis of the secondary-side coil 4.

The smartphone terminal 500 to which the power transmission apparatus 100 according to the first embodiment is attached includes a touch panel 501 (see FIG. 7) disposed on its front side and the secondary-side coil 4 (see FIGS. 8 and 9) incorporated in the rear side of the smartphone terminal 500.

The smartphone terminal 500 further includes the battery 9 as illustrated in FIG. 10. The power receiver 20 includes the secondary-side coil 4.

The smartphone terminal 500 further includes a central processing unit (CPU) configured to perform conversations, telecommunications and various types of processing, and memories; however, illustration of the CPU and the memories are omitted from the specification.

Figure 11:
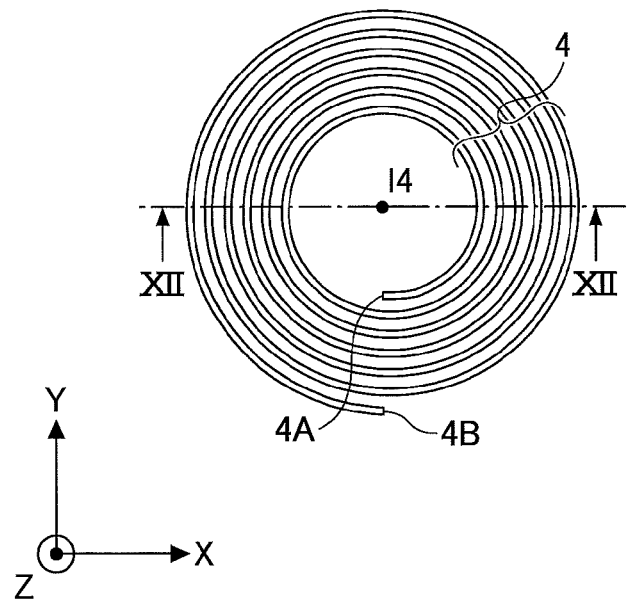
FIG. 11 is a plan diagram illustrating a secondary-side coil 4 included in the smartphone terminal 500.
Figure 12:
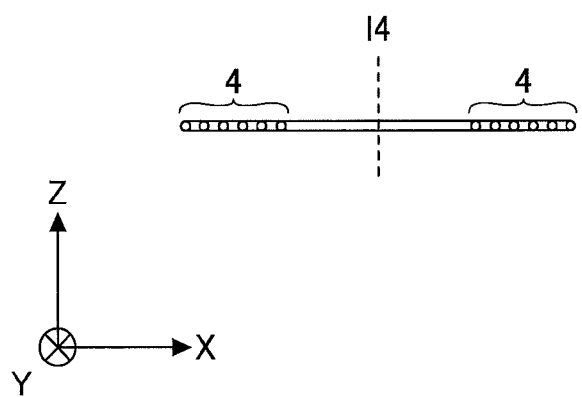
FIG. 12 is a cross-sectional diagram cut along a dash-dot line XII-XII of FIG. 11.

FIG. 11 is a plan diagram illustrating the secondary-side coil 4 included in the smartphone terminal 500, and FIG. 12 is a cross-sectional diagram cut along a dash-dot line XII-XII of FIG. 11. The cross-sectional diagram cut along the broken line XII-XII is a cross section passing through the central axis 14 of the secondary-side coil 4. Note that the X, Y, and Z coordinate system is defined as illustrated in FIGS. 11 and 12.

The secondary-side coil 4 is a planar coil having the number of turns being six, and end parts 4A and 4B of the secondary-side coil 4 are connected to the rectifier circuit 7 (see FIGS. 1 and 2). The equivalent circuit schematic diagram of the secondary-side coil 4 is illustrated in FIG. 2.

Figure 13:
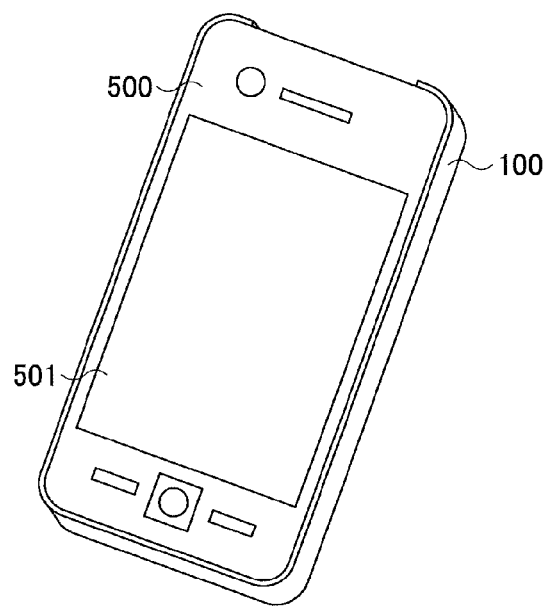
FIG. 13 is a perspective diagram illustrating a front side of a smartphone terminal 500 to which the power transmission apparatus 100 according to the first embodiment is attached.
Figure 14:
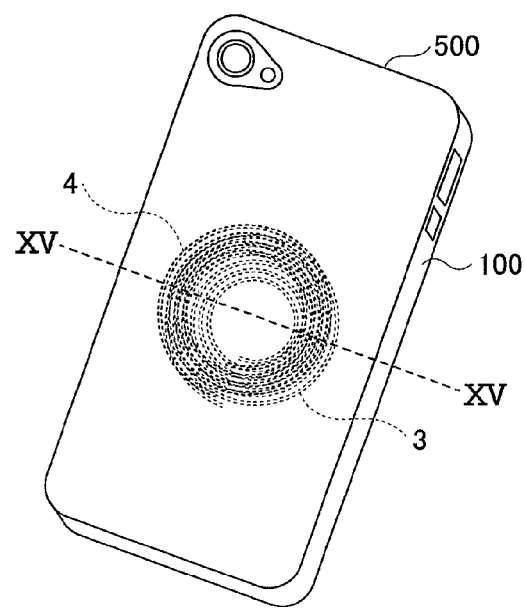
FIG. 14 is a perspective diagram illustrating a rear side of the smartphone terminal 500 to which the power transmission apparatus 100 according to the first embodiment is attached.
Figure 15:
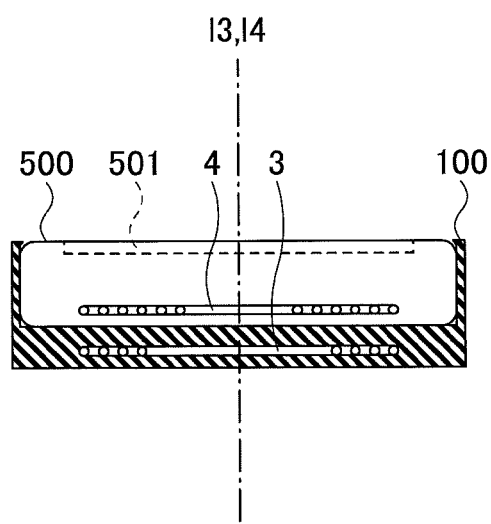
FIG. 15 is a cross-sectional diagram cut along a broken line XV-XV of FIG. 14.

Next, a description is given of details of the smartphone terminal 500 to which the power transmission apparatus 100 of the first embodiment is attached with reference to FIGS. 13 to 15.

FIG. 13 is a perspective diagram illustrating a front side of the smartphone terminal 500 to which the power transmission apparatus 100 according to the first embodiment is attached, FIG. 14 is a perspective diagram illustrating a rear side of the smartphone terminal 500 to which the power transmission apparatus 100 according to the first embodiment is attached, and FIG. 15 is a cross-sectional diagram cut along a broken line XV-XV of FIG. 14. The cross-sectional diagram cut along the broken line XV-XV is a cross section passing through the central axis 13 of the secondary-side resonant coil 3 and the central axis 14 of the secondary-side coil 4.

As illustrated in FIGS. 13 to 15, when the power transmission apparatus 100 is attached to the smartphone terminal 500, the secondary-side resonant coil 3 incorporated in the power transmission apparatus 100 is disposed close to the secondary-side coil 4 incorporated in the rear side of the smartphone terminal 500. In the above-described state, the central axis 13 of the secondary-side resonant coil 3 matches the central axis 14 of the secondary-side coil 4, as illustrated in FIG. 15.

Hence, the secondary-side coil 4 of the smartphone terminal 500 is electromagnetically coupled with the secondary-side resonant coil 3 of the power transmission apparatus 100.

Accordingly, the smartphone terminal 500 receives electric power via the power transmission apparatus 100 by magnetic field resonance to charge the battery 9 by attaching the power transmission apparatus 100 to the smartphone terminal 500 as illustrated above.

Next, a description is given of the power transmitter 10 that is used when the smartphone terminal 500 to which the power transmission apparatus 100 of the first embodiment is attached is charged with reference to FIGS. 16 to 19.

Figure 16:
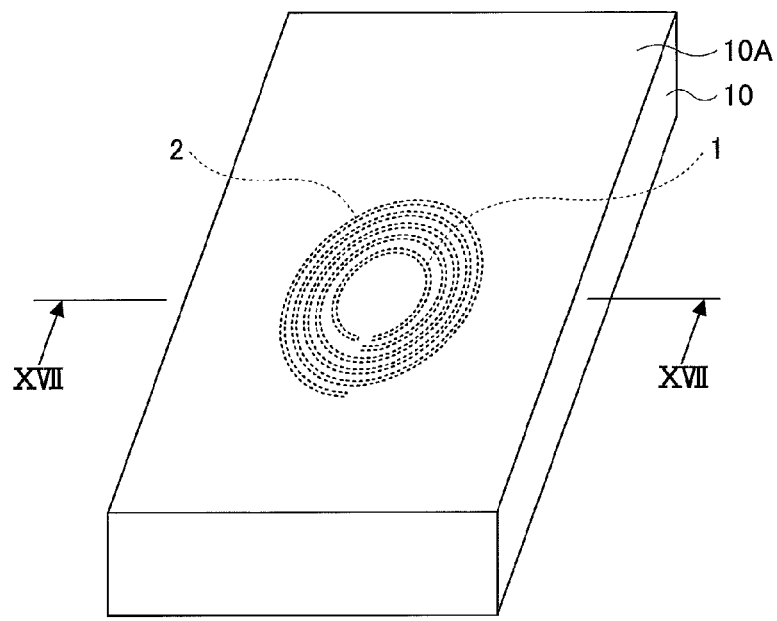
FIG. 16 is a perspective diagram illustrating a power transmitter 10 used for charging the smartphone terminal 500 to which the power transmission apparatus 100 according to the first embodiment is attached.
Figure 17:
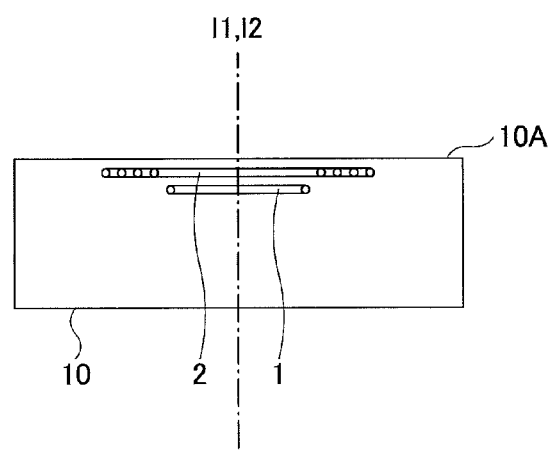
FIG. 17 is a cross-sectional diagram cut along a line XVII-XVII of FIG. 16.

FIG. 16 is a perspective diagram illustrating the power transmitter 10 used for charging the smartphone terminal 500 to which the power transmission apparatus 100 according to the first embodiment is attached, and FIG. 17 is a cross-sectional diagram cut along a line XVII-XVII of FIG. 16. The cross-sectional diagram cut along the line XVII-XVII is a cross section passing through the central axis 11 of the primary-side coil 1 and the central axis 12 of the primary-side resonant coil 2.

Figure 18:
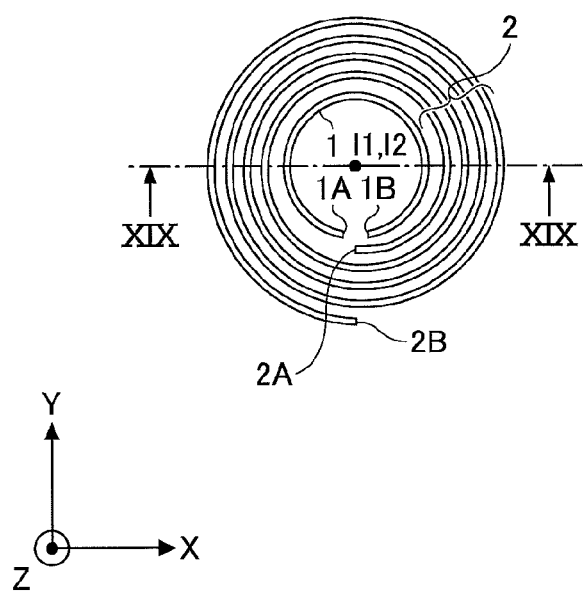
FIG. 18 is a plan diagram illustrating a primary-side coil 1 and a primary-side resonant coil 2 included in the power transmitter 10.
Figure 19:
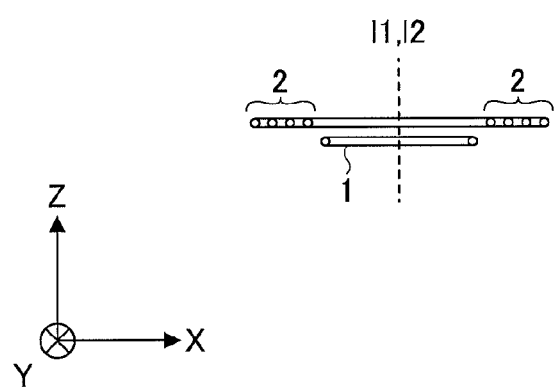
FIG. 19 is a cross-sectional diagram cut along a dash-dot line XIX-XIX of FIG. 18.

FIG. 18 is a plan diagram illustrating the primary-side coil 1 and the primary-side resonant coil 2 included in the power transmitter 10, and FIG. 19 is a cross-sectional diagram cut along a dash-dot line XIX-XIX of FIG. 18. Note that the X, Y, and Z coordinate system is defined as illustrated in FIGS. 18 and 19.

As illustrated in FIGS. 16 and 17, the power transmitter 10 includes the primary-side coil 1 and the primary-side resonant coil 2. An upper surface 10A of the power transmitter 10 serves as a surface over which an electronic apparatus is passed when the electronic apparatus such as a smartphone terminal or a mobile phone terminal that incorporates a power receiving apparatus is charged.

Although the matching circuit 5 and the AC power supply 6 of the power transmitter 10 are not illustrated in FIGS. 16 and 17, the primary-side coil 1 of the power transmitter 10 is connected with the AC power supply 6 via the matching circuit 5, as illustrated in FIGS. 1 and 2.

As illustrated in FIGS. 18 and 19, the primary-side coil 1 is a loop-shaped planar coil having the number of turns being one, and end parts 1A and 1B of the primary-side coil 1 are connected to the AC power supply 6 via the matching circuit 5. The primary-side resonant coil 2 is a spiral planar coil having the number of turns being four, and end parts 2A and 2B of the primary-side resonant coil 2 are connected to a not-illustrated capacitor. The resonance frequency of the primary-side resonant coil 2 is adjusted by connecting two ends (i.e., the end parts 2A and 2B) of the primary-side resonant coil 2 to the not-illustrated capacitor. The equivalent circuit schematic diagram of the primary-side resonant coil 2 is illustrated in FIG. 2. The capacitance C2 of the capacitor illustrated in FIG. 2 indicates a compound capacitance of a parasitic capacitance of the primary-side resonant coil 2 and an electrostatic capacitance of the capacitor connected between the end parts 2A and 2B of the primary-side resonant coil 2.

Note that when the resonance frequency is set by the parasitic capacitance of the primary-side resonant coil 2 alone, it may be unnecessary to connect the capacitor for adjusting the resonance frequency between the end parts 2A and 2B of the primary-side resonant coil 2. In such a case, the primary-side resonant coil 2 is formed as a loop-shaped coil by mutually connecting the end parts 2A and 2B of the primary-side resonant coil 2. Further, when the resonance frequency is set by the parasitic capacitance of the primary-side resonant coil 2 alone and the stray capacitance of the primary-side resonant coil 2 is able to be fixed, the two end parts 2A and 2B of the primary-side resonant coil 2 may be open.

As illustrated in FIG. 17, the primary-side resonant coil 2 is disposed closer to the upper surface 10A side than the primary-side coil 1. The primary-side coil 1 is disposed close to the primary-side resonant coil 2. In the above-described state, the central axis 11 of the primary-side coil 1 matches the central axis 12 of the primary-side resonant coil 2, as illustrated in FIGS. 17 to 19.

Hence, the primary-side coil 1 is electromagnetically coupled with the primary-side resonant coil 2.

Accordingly, the AC power output from the AC power supply 6 is transmitted from the primary-side coil 1 to the primary-side resonant coil 2 of the power transmitter 10 by electromagnetic induction.

Figure 20:
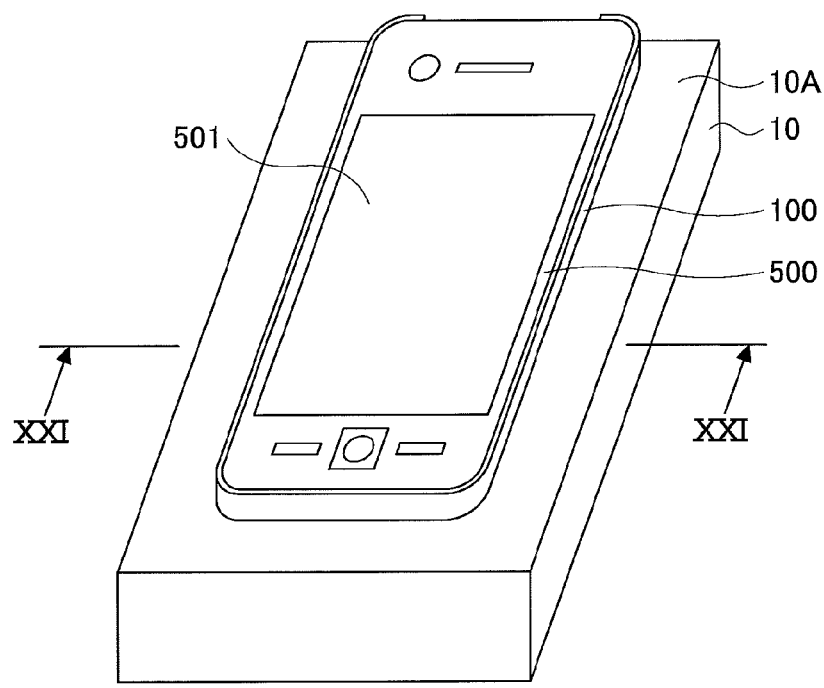
FIG. 20 is a perspective diagram illustrating a state in which the smartphone terminal 500 to which the power transmission apparatus 100 according to the first embodiment is attached is passed over the power transmitter 10.
Figure 21:
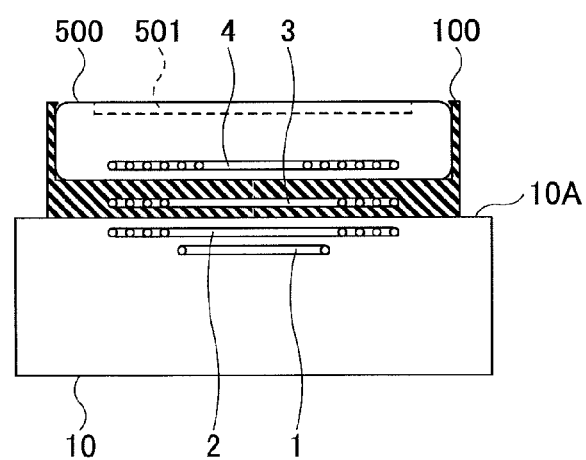
FIG. 21 is a cross-sectional diagram cut along a line XXI-XXI of FIG. 20.

Next, a description is given of a charging method of the smartphone terminal 500 to which the power transmission apparatus 100 of the first embodiment is attached with reference to FIGS. 20 and 21.

FIG. 20 is a perspective diagram illustrating a state in which the smartphone terminal 500 to which the power transmission apparatus 100 according to the first embodiment is attached is passed over the power transmitter 10, and FIG. 21 is a cross-sectional diagram cut along a line XXI-XXI of FIG. 20. The cross-sectional diagram cut along the line XXI-XXI is a cross section passing through the central axis of the primary-side coil 1, the central axis of the primary-side resonant coil 2, the central axis of the secondary-side resonant coil 3, and the central axis of the secondary-side coil 4.

As illustrated in FIGS. 20 and 21, when the smartphone terminal 500 to which the power transmission apparatus 100 according to the first embodiment is attached is passed over the upper surface 10A of the power transmitter 10, magnetic field resonance is generated between the primary-side resonant coil 2 of the power transmitter 10 and the secondary-side resonant coil 3 of the power transmission apparatus 100. Hence, AC power output from the AC power supply 6 of the power transmitter 10 (see FIGS. 1 and 2) is transmitted from the primary-side coil 1 to the primary-side resonant coil 2 by electromagnetic induction, and the transmitted power is further transmitted from the primary-side resonant coil 2 to the secondary-side resonant coil 3 of the power transmission apparatus 100 by magnetic field resonance. Further, the power transmitted to the secondary-side resonant coil 3 of the power transmission apparatus 100 is then transmitted to the secondary-side coil 4 of the smartphone terminal 500 by electromagnetic induction.

Accordingly, by attaching the power transmission apparatus 100 of the first embodiment to the smartphone terminal 500, electric power may be transmitted to the smartphone terminal 500 having the electromagnetic induction type power receiver 20 by magnetic field resonance to charge the battery 9 of the smartphone terminal 500.

Note that FIGS. 20 and 21 illustrate a state in which the smartphone terminal 500 to which the power transmission apparatus 100 is attached is located close to the power transmitter 10 such that the central axis of the primary-side resonant coil 2 approximately matches the central axis of the secondary-side resonant coil 3. However, since the power transmission apparatus 100 and the smartphone terminal 500 receives electric power from the power transmitter 10 by magnetic field resonance, it may be possible to transmit electric power from the power transmitter 10 to the power transmission apparatus 100 and the smartphone terminal 500 by having a distance of approximately several meters between the power transmitter 10, and the power transmission apparatus 100 and the smartphone terminal 500. Further, in the above configuration, even if the central axis of the primary-side resonant coil 2 does not match the central axis of the secondary-side resonant coil 3, it may be possible to transmit electric power efficiently.

The related art electromagnetic induction type power transmitter and power receiver the principle of which is well known in the art have already put in practice; however, it may take longer time for the magnetic field resonance type power transmitter and power receiver to become popular than it did for the electromagnetic induction type power transmitter and power receiver.

Hence, in a case where the magnetic field resonance type power transmitter and power receiver are becoming popular after the electromagnetic induction type power transmitter and power receiver have been widely used, the electromagnetic induction type power receiver may be passed over the magnetic field resonance type power transmitter. The situation of this kind may occur, for example, in a transitional period when the power transmitter to be used outside for the smartphone is shifted from the electromagnetic induction type to the magnetic field resonance type.

In such a case, even if the smartphone 500 resides in a place where there are only the magnetic field resonance type power transmitters, the smartphone terminal 500 may be able to receive electric power by magnetic field resonance via the power transmission apparatus 100 to charge the battery 9 of the smartphone terminal 500 by attaching the power transmission apparatus 100 of the first embodiment to the smartphone terminal 500.

The power transmission by magnetic field resonance may be able to handle the positional misalignment between the power transmitting side and the power receiving side better than the power transmission by electromagnetic induction, and have an advantage of "free-positioning" that is capable of transmitting power between the transmitting side and the receiving side being distant from each other, without allowing the transmitting side and the receiving side to be close to each other.

Accordingly, in the above-described transitional period, even if the smartphone terminal 500 is compatible to the electromagnetic induction type power transmission system, the smartphone terminal 500 is capable of transmitting power by magnetic field resonance by attaching the power transmission apparatus 100 of the first embodiment to the smartphone terminal 500, which may enhance the convenience of the smartphone terminal 500.

The power transmission apparatus 100 of the first embodiment is a jacket-type, which may facilitate attaching the power transmission apparatus 100 to the smartphone terminal 500.

Hence, the power transmission apparatus 100 including the secondary-side resonant coil 3 may be easily attached later to the smartphone terminal 500 incorporating the electromagnetic induction type power receiver 20 to easily convert the smartphone terminal 500 incorporating the electromagnetic induction type power receiver 20 into the smartphone terminal 500 incorporating the magnetic field resonance type power receiver.

Further, since the power transmission apparatus 100 includes the secondary-side resonant coil 3 implemented as a planer coil, the thickness of the power transmission apparatus 100 having the secondary-side resonant coil 3 may be minimized compared to the jacket without the secondary-side resonant coil 3. Accordingly, the exterior of the smartphone terminal 500 is scarcely affected, without causing a user of the smartphone terminal 500 to feel uncomfortable.

Since a large number of smartphone users attach jackets to their smartphones, the power transmission apparatus 100 of the first embodiment is an extremely convenient product for the users of the smartphone terminal 500 who wish to convert the smartphone terminal 500 including the electromagnetic induction type power receiver 20 into the smartphone terminal 500 including the magnetic field resonance type power receiver.

Further, the power transmission apparatus 100 is not electrically connected to the smartphone terminal 500 with a wire, which may improve its reliability.

Further, an example which uses the magnetic field resonance type power transmitter 10 is described above. However, the users of the smartphone terminal 500 to which the power transmission apparatus 100 is attached may charge the battery 9 of the smartphone terminal 500 by the electromagnetic induction type power transmitter having no primary-side resonant coil 2 in the transitional period in which the power transmission system is shifted.

In such a case, the power receiver 20 of the smartphone may be able to receive electric power transmitted from the electromagnetic induction type power transmitter to charge the battery 9 of the smartphone terminal 500 by detaching the jacket type power transmission apparatus 100 from the smartphone terminal 500. Since the power transmission apparatus 100 of the first embodiment is a jacket type, it is extremely easy to attach or detach the power transmission apparatus 100. Hence, when the power transmitter is an electromagnetic induction type, the battery 9 of the smartphone 500 may be able to be charged by detaching the power transmission apparatus 100.

Accordingly, it may be possible to provide the smartphone terminal 500 having the electromagnetic induction type power receiver 20 with compatibility between the magnetic field resonance type and the electromagnetic induction type by employing the jacket type power transmission apparatus 100 of the first embodiment.

Note that in the above description, the cover part 101 of the power transmission apparatus 100 (see FIGS. 3 and 4) serves as a jacket for the smartphone terminal 500; however, the cover part 101 of the power transmission apparatus 100 is not specifically limited to the jacket for the smartphone terminal 500.

The cover part 101 may be any attachment that aligns the position of the secondary-side coil 4 of the electronic apparatus to be charged with the electric power received by electromagnetic induction and the position of the secondary-side resonant coil 3. Examples of such an electronic apparatus may include a mobile phone terminal, a personal computer (PC), a digital still camera, a digital video camera, or a mobile game apparatus in addition to the smartphone terminal 500.

Further, in the above description, an example of the secondary-side resonant coil 3 is given as a planer spiral coil having the number of turns being four. However, the shape of the secondary-side resonant coil 3 is not specifically limited to the planer spiral coil. The secondary-side resonant coil 3 may have any shape insofar as the secondary-side resonant coil 3 is capable of receiving electric power from the primary-side resonant coil 2 by magnetic field resonance, and being electromagnetically coupled with the secondary-side coil 4 to transmit electric power by electromagnetic induction. Likewise, the number of turns of the secondary-side resonant coil 3 is not specifically limited to four.

The shape of the secondary-side resonant coil 3 may be rectangular in a planer view, and formed in a rectangular spiral shape. Further, the number of turns of the secondary-side resonant coil 3 may be optimized based on a relationship between the primary-side resonant coil 2 and the secondary-side coil 4.

Further, in the above description, an example is given as the power transmission apparatus 100 being attached to the smartphone terminal 500 serving as the electronic apparatus. However, the power transmission apparatus 100 may be attached to the upper surface 10A of the power transmitter 10. In such a case, the cover part 101 of the power transmission apparatus 100 may be a simple sheet type instead of a jacket type. In this configuration, the battery 9 of the smartphone terminal 500 may be able to be charged with electric power received from the magnetic field resonance type power transmitter 10 by passing the smartphone terminal 500 over the power transmission apparatus 100 attached to the upper surface 10A of the power transmitter 10. In this case, the smartphone terminal 500 may simply be moved to the power transmission apparatus 100 such that the central axis of the secondary-side coil 4 of the smartphone terminal 500 matches the central axis of the secondary-side resonant coil 3 of the power transmission apparatus 100.

Moreover, in the above description, an example is given as insert-molding polycarbonate resin such that the secondary-side resonant coil 3 is incorporated in the cover part 101 of the power transmission apparatus 100. However, the power transmission apparatus 100 is not specifically limited to such a configuration. The secondary-side resonant coil 3 may be configured to be attached to the cover part 101 using a sheet-like sealing member.

Alternatively, the power transmission apparatus 100 may be formed by injection molding the cover part 101 and then printing the secondary-side resonant coil 3 on a surface of the cover part 101. In such a case, the secondary-side resonant coil 3 may be formed on any one of a surface of the cover part 101 that is attached to the smartphone terminal 500 and a surface of the cover part 101 that is not attached to the smartphone terminal 500. The surface on which the secondary-side resonant coil 3 is formed may be protected by attaching a protection sheet or the like. Alternatively, the surface on which the secondary-side resonant coil 3 is formed may be protected by attaching a thin substrate or the like.

Further, when the cover part 101 is made for adjusting a magnetic characteristic of the secondary-side resonant coil 3, it may be possible to mix magnetic powder or the like with polycarbonate resin, or insert-mold the cover part 101 to include a magnetic sheet.

Moreover, in the above description, an example is given as the cover part 101 being made of polycarbonate resin. However, a material for the cover part 101 is not specifically limited to polycarbonate resin. The material for the cover part 101 may be any resin other than polycarbonate resin insofar as the resin is a nonmagnetic and non-conducting material. For example, the cover part 101 may be made of acrylic resin.

Second Embodiment

Figure 22:
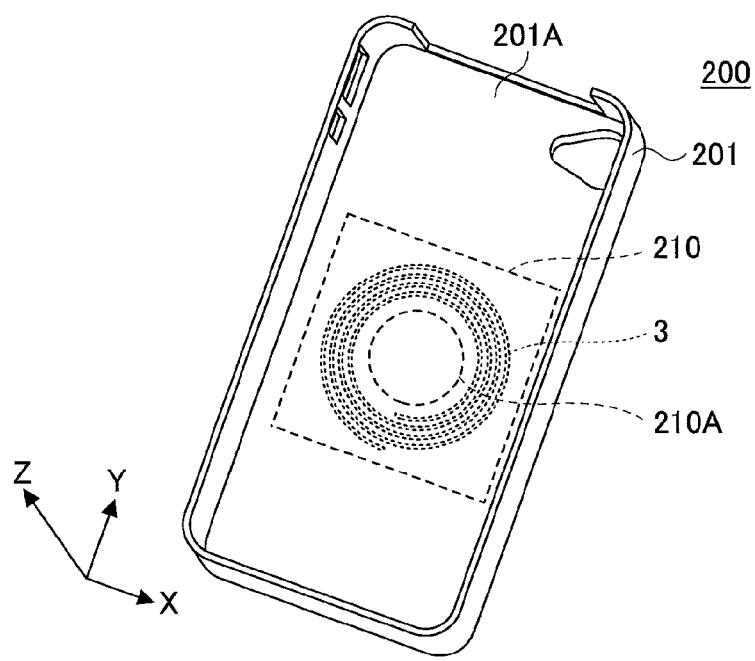
FIG. 22 is a perspective diagram illustrating a power transmission apparatus 200 according to a second embodiment.
Figure 23:
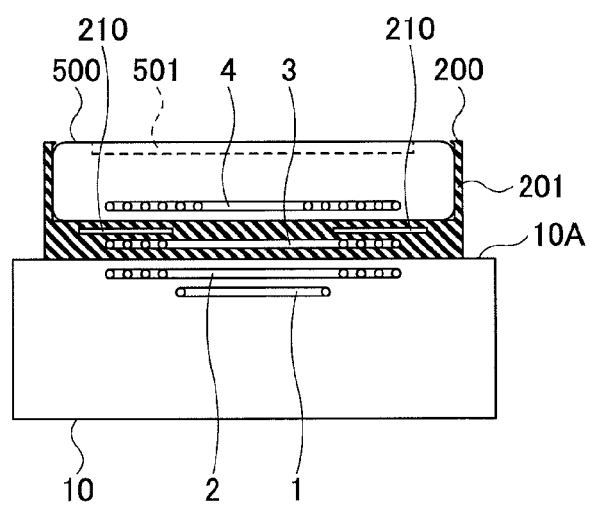
FIG. 23 is a cross-sectional diagram illustrating the smartphone 500 to which the power transmission apparatus 200 is attached.

FIG. 22 is a perspective diagram illustrating a power transmission apparatus 200 according to a second embodiment, and FIG. 23 is a cross-sectional diagram illustrating the smartphone 500 to which the power transmission apparatus 200 is attached. The cross-sectional diagram illustrated in FIG. 23 is a cross section passing through the central axis of the primary-side coil 1, the central axis of the primary-side resonant coil 2, the central axis of the secondary-side resonant coil 3, and the central axis of the secondary-side coil 4. Note that in FIG. 22, an X-axis is parallel to a short direction of the power transmission apparatus 200, a Y-axis is parallel to a longitudinal direction of the power transmission apparatus 200, and a Z-axis extends along a thickness direction of the power transmission apparatus 200.

The power transmission apparatus 200 of the second embodiment includes a jacket type cover part 201 for use in the smartphone terminal 500 similar to the cover part 101 of the power transmission apparatus 100 of the first embodiment.

The power transmission apparatus 200 of the second embodiment differs from the power transmission apparatus 100 of the first embodiment in that a magnetic sheet 210 disposed in an area where the secondary-side resonant coil 3 is disposed in a planer view is incorporated in the cover part 201.

The magnetic sheet 210 is a sheet-like member formed of a magnetic substance, and serves as an example of a magnetic part made of a magnetic material having relatively high magnetic permeability. Further, the magnetic sheet 210 may need to be made of a non-conducting material in order to prevent loss due to generation of eddy current. Hence, the magnetic sheet 210 may, for example, be made of a ferritic material or a manganese material.

It may be preferable that the power transmission apparatus 200 be thin since the power transmission apparatus 200 is a jacket type power transmission apparatus for use in the smartphone terminal 500. Accordingly, it may be preferable that the magnetic sheet 210 be formed as thinly as possible.

On the other hand, the magnetic sheet 210 is disposed in order to lower the coupling strength between the secondary-side resonant coil 3 and the secondary-side coil 4 without forming the jacket type power transmission apparatus 200 thickly. Hence, it may be preferable that the magnetic sheet 210 have high magnetic permeability.

Further, since the magnetic permeability has a frequency characteristic, the magnetic permeability may be set based on the frequency of the AC power transmitted between the secondary-side resonant coil 3 and the secondary-side coil 4.

In the second embodiment, the magnetic sheet 210 is a sheet-like member made of a ferritic material, and has magnetic permeability of 200 at the frequency of 2 MHz.

The magnetic sheet 210 is a rectangular sheet-like member in a planer view, and includes a round opening part 210A in the center of the rectangular sheet-like member. The opening part 210A may, for example, be a punched hole punched by a punching apparatus. The center of the opening part 210A matches the central axis of the secondary-side resonant coil 3. Note that it is not necessary to match the center of the opening part 210A and the central axis of the secondary-side resonant coil 3.

The cross section illustrated in FIG. 23 is cut along the short direction (X-axis direction) of the cover part 201 over the central axis of the secondary-side resonant coil 3 in a state where the power transmission apparatus 200 is attached to the smartphone terminal 500.

The magnetic sheet 210 is, as illustrated in FIG. 23, disposed closer to the surface 201A (see FIG. 22) attached to the smartphone terminal 500 than the secondary-side resonant coil 3. The magnetic sheet 210 is disposed in the above-described manner in order to optimize the power transmission efficiency between the secondary-side resonant coil 3 and the primary-side resonant coil 2 of the power transmitter 10.

The power transmission apparatus 200 may, for example, be formed by insert-molding the cover part 201 with polycarbonate resin to incorporate the secondary-side resonant coil 3 and the magnetic sheet 210 in a state where the magnetic sheet 210 is disposed over the secondary-side resonant coil 3.

Figure 24:
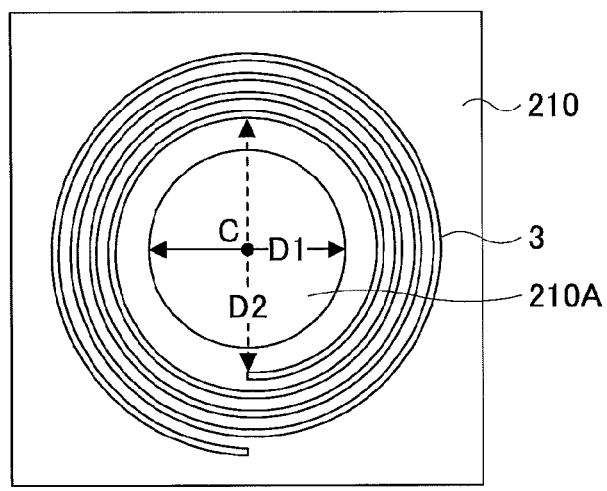
FIG. 24 is a plan diagram illustrating a magnetic sheet 210 and a secondary-side resonant coil 3 included in the power transmission apparatus 200 according to the second embodiment.
Figure 25:
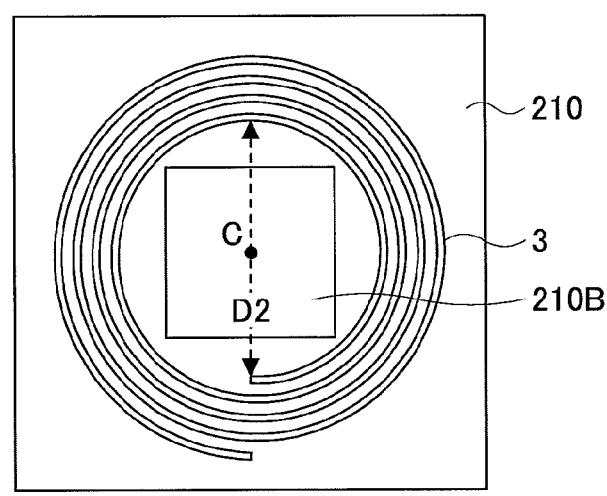
FIG. 25 is another plan diagram illustrating the magnetic sheet 210 and the secondary-side resonant coil 3 included in the power transmission apparatus 200 according to the second embodiment.

FIG. 24 is a plan diagram illustrating the magnetic sheet 210 and the secondary-side resonant coil 3 included in the power transmission apparatus 200 according to the second embodiment, and FIG. 25 is another plan diagram illustrating the magnetic sheet 210 and the secondary-side resonant coil 3 included in the power transmission apparatus 200 according to the second embodiment.

As illustrated in FIG. 24, the magnetic sheet 210 is a rectangular sheet-like member larger than the secondary-side resonant coil 3 in a planer view.

The opening part 210A is aligned such that the center C matches the central axis of the secondary-side resonant coil 3. The diameter D1 of the opening part 210A is configured to be smaller than an internal diameter D2 of an innermost loop of the secondary-side resonant coil 3.

Further, a rectangular opening part 210B may be formed in the magnetic sheet 210 as illustrated in FIG. 25 in place of the opening part 210A illustrated in FIG. 24.

The reasons for disposing the magnetic sheet 210 closer to the surface 210A (see FIG. 22) attached to the smartphone terminal 500 than the secondary-side resonant coil 3 may be as follows.

When electric power is transmitted from the transmitting side to the receiving side by electromagnetic induction, the power is directly transmitted from the primary-side coil 1 to the secondary-side coil 4. In this case, the primary-side resonant coil 2 and the secondary-side resonant coil 3 are not used.

When the smartphone terminal 500 incorporating the secondary-side coil 4 is disposed with considering the power reception by such electromagnetic induction, the shape, the size, and the number of turns, and the like of the secondary-side coil 4 may be optimized by increasing the coupling strength with the primary-side coil 1 such that the best power receiving efficiency may be acquired by electromagnetic induction.

When the secondary-side coil 4 is designed to increase the coupling strength with the primary-side coil 1, excessive coupling strength between the secondary-side resonant coil 3 and the secondary-side coil 4 may be obtained by attaching the power transmission apparatus 200 incorporating the secondary-side resonant coil 3 to the smartphone terminal 500.

In such a case, when the power is transmitted by electromagnetic induction between the primary-side resonant coil 2 of the power transmitter 10 and the secondary-side resonant coil 3 of the power transmission apparatus 200, the power consumed by the secondary-side coil 4 from the secondary-side resonant coil 3 may be relatively high. Hence, efficiency in power transmission by magnetic field resonance may be reduced.

Note that in order to improve the efficiency in power transmission by magnetic field resonance, the coupling strength between the secondary-side resonant coil 3 and the secondary-side coil 4 may be reduced.

In order to reduce the coupling strength between the secondary-side resonant coil 3 and the secondary-side coil 4, the magnetic sheet 210 may be disposed between the secondary-side resonant coil 3 of the power transmission apparatus 200 and the secondary-side coil 4 of the smartphone terminal 500.

Hence, in the second embodiment, the magnetic sheet 2 is disposed closer to the surface 201A (see FIG. 22) attached to the smartphone terminal 500 than the secondary-side resonant coil 3 of the power transmission apparatus 200.

In the power transmission apparatus 200 of the second embodiment, even if the coupling strength between the secondary-side resonant coil 3 and the secondary-side coil 4 is relatively high, it may be possible to improve the efficiency in power transmission by magnetic field resonance by reducing the coupling strength between the secondary-side resonant coil 3 and the secondary-side coil 4 using the magnetic sheet 210.

Note that a description is given, with reference to FIGS. 26A, 26B, and 26C of a simulation result of the power transmission efficiency when the power is transmitted.

FIGS. 26A, 26B, and 26C are cross-sectional diagrams, each illustrating a state in which power is transmitted from the power transmitter 10 to the smartphone 500. FIG. 26A is a diagram illustrating a state in which the smartphone terminal 500 is used alone (without being attached to power transmission apparatus 100 or power transmission apparatus 200), FIG. 26B is a diagram illustrating a state in which the smartphone terminal 500 to which the power transmission apparatus 100 of the first embodiment is attached is used, and FIG. 26C is a diagram illustrating a state in which the smartphone terminal 500 to which the power transmission apparatus 200 of the second embodiment is attached is used.

The power transmission efficiency used herein indicates a ratio of the AC power output from the secondary-side coil 4 with respect to the AC power input to the primary-side coil 1.

The simulation is made by electromagnetic field simulation in which the primary-side coil 1, the primary-side resonant coil 2, the secondary-side resonant coil 3, and the secondary-side coil 4 are all made by winding copper wires, and have respective wire diameters, outer diameters, and numbers of turns as illustrated below.

The primary-side coil 1 is configured to include a wire diameter of 0.5 mm, an outer diameter of 20 mm, and the number of turns of one. The primary-side resonant coil 2 is configured to include a wire diameter of 0.5 mm, an outer diameter of 30 mm, and the number of turns of four. The secondary-side resonant coil 3 is configured to include a wire diameter of 0.5 mm, an outer diameter of 30 mm, and the number of turns of four. The secondary-side coil 4 is configured to include a wire diameter of 0.5 mm, an outer diameter of 30 mm, and the number of turns of 15.

Note that since the primary-side coil 1 is a planer coil having the number of turns being one, the outer diameter of the primary-side coil 1 indicates the outer diameter of the loop-like wound copper wire. Further, since the primary-side resonant coil 2, the secondary-side resonant coil 3, and the secondary-side coil 4 are each planer spiral coils, the outer diameter indicates the largest outer diameter of a spiral copper wire.

Moreover, the magnetic sheet 210 of the power transmission apparatus 200 is configured to have both vertical and horizontal lengths of 40 mm in a planer view, a thickness of 0.2 mm, magnetic permeability of 200, and the opening part 210A being a round opening part having a diameter of 22 mm.

Note that in this simulation, the frequency of the AC power input in the primary-side coil 1 is set at 2 MHz, and a loading resistor having a resistance value (ohmic value) of 10Ω is connected to the secondary-side coil 4.

As illustrated in FIG. 26A, the power transmission efficiency when the smartphone terminal 500 is directly passed over the power transmitter 10 without attaching the power transmission apparatus 100 or 200 is 63.6%.

In a case of FIG. 26A, the secondary-side coil 4 of the smartphone terminal 500 receives the power from the primary-side resonant coil 2 (or both the primary-side coil 1 and the primary-side resonant coil 2) by electromagnetic induction.

With this power transmission efficiency, when 5 W power is transmitted to the smartphone terminal 500, approximately 7.9 W AC power may need to be input into the primary-side coil 1 such that approximately 2.9 W power may be consumed between the primary-side coil 1, the primary-side resonant coil 2, and the secondary-side coil 4.

The reason for the power transmission efficiency being relatively low may be as follows. Since the smartphone terminal 500 incorporating the secondary-side coil 4 optimized corresponding to the electromagnetic induction type power transmission system is directly passed over the magnetic field resonance type power transmitter 10, the coupling strength between the primary-side resonant coil 2 (or both the primary-side coil 1 and the primary-side resonant coil 2) and the secondary-side coil 4 may be low.

When the electromagnetic induction type power transmitting system has become widely spread in advance and the magnetic field resonance type power transmitting system is widely spread later, it may be expected that the smartphone terminal 500 employing the electromagnetic induction type power transmission system is directly passed over the power transmitter 10 employing the magnetic field resonance type power transmission system as illustrated in FIG. 26A. In such a case, a longer time may be needed to charge the battery 9 of the smartphone terminal 500, or about 40 percent of the electric power output from the power transmitter 10 to the smartphone terminal 500 is lost without being transmitted, which may result in inefficient power transmission.

As illustrated in FIG. 26B, the power transmission efficiency obtained for the smartphone terminal 500 when the power transmission apparatus 100 of the first embodiment is passed over the power transmitter 10 is 77.7%. This indicates that the power transmission efficiency is significantly improved compared to that obtained in FIG. 26A.

This is because electric power is efficiently transmitted form the primary-side resonant coil 2 of the power transmitter 10 to the secondary-side resonant coil 3 of the power transmission apparatus 100 by magnetic field resonance.

This power transmission efficiency, for example, indicates that when 5 W power is transmitted to the smartphone terminal 500, approximately 6.4 W AC power may need to be input into the primary-side coil 1. Thus, loss of power is significantly lowered compared to that obtained in FIG. 26A.

Accordingly, it may be possible to transmit power from the power transmitter 10 to the smartphone terminal 500 efficiently using magnetic field resonance by attaching the power transmission apparatus 100 to the smartphone terminal 500.

The power transmission apparatus 100 is a jacket type power transmission apparatus such that the power transmission apparatus 100 is easily attached to the smartphone terminal 500. Hence, the power transmission apparatus 100 is extremely useful when the electromagnetic induction type power transmitting system has become widely spread in advance and the magnetic field resonance type power transmitting system is widely spread later.

As illustrated in FIG. 26C, the power transmission efficiency obtained for the smartphone terminal 500 when the power transmission apparatus 200 of the second embodiment is passed over the power transmitter 10 is 88.7%. This indicates that the power transmission efficiency is further significantly improved compared to that obtained in FIG. 26B.

In this simulation, since the number of turns of the secondary-side coil 4 included in the smartphone terminal 500 is increased from four to a relatively large number of turns of 15, the coupling strength between the secondary-side resonant coil 3 of the power transmission apparatus 100 and the secondary-side coil 4 illustrated in FIG. 26B may be exceedingly strong.

This power transmission efficiency, for example, indicates that when 5 W power is transmitted to the smartphone terminal 500, approximately 5.6 W AC power may need to be input into the primary-side coil 1. Thus, loss of power is further significantly lowered compared to that obtained in FIG. 26B.

Hence, in a case of FIG. 26C, the power transmission efficiency may be improved because the coupling strength between the secondary-side resonant coil 3 and the secondary-side coil 4 is lowered by the presence of the magnetic sheet 210 of the power transmission apparatus 200 such that energy transmitted from the primary-side resonant coil 2 of the power transmitter 10 to the secondary-side resonant coil 3 of the power transmission apparatus 200 may efficiently be transmitted to the secondary-side coil 4.

As described above, when the power transmission apparatus 200 including the magnetic sheet is attached to the smartphone terminal 500 including the secondary-side coil 4 optimized for electromagnetic induction, power may efficiently be transmitted from the magnetic field resonance type power transmitter 10 to the smartphone terminal 500.

The above case may be expected to occur in a transitional period in which the electromagnetic induction type power transmitting system has become widely spread in advance and the magnetic field resonance type power transmitting system is widely spread later. Hence, the power transmission apparatus 200 of the second embodiment may be an extremely useful product in the above-described transitional period in which the power transmission system is shifted as described above.

Figure 27:
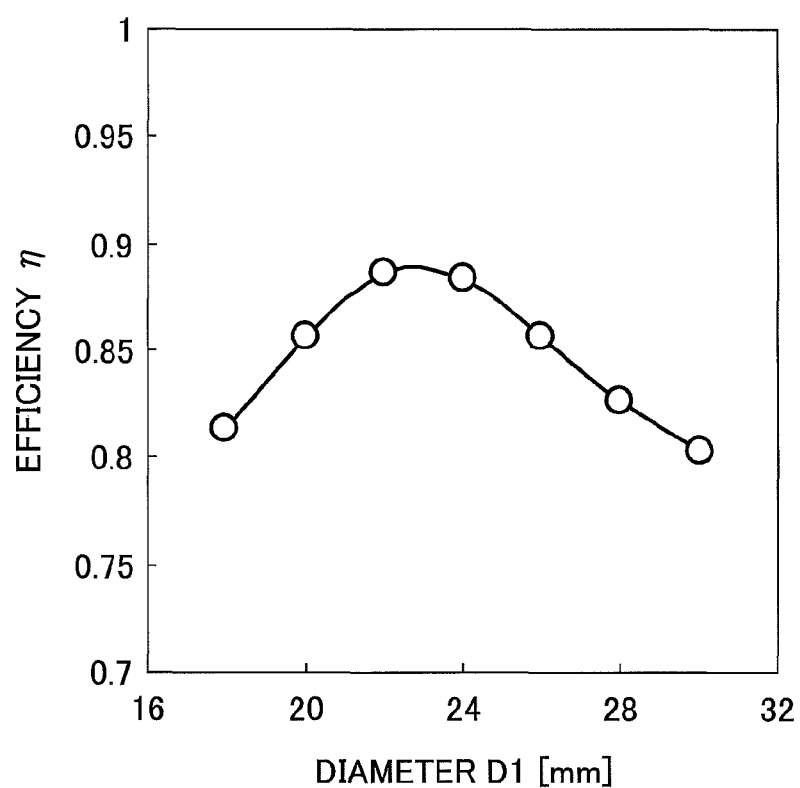
FIG. 27 is a diagram illustrating a characteristic of power transmission efficiency with respect to a diameter of an opening part 210A of the magnetic sheet 210 of the power transmission apparatus 200.

Next, a description is given, with reference to FIG. 27, of a simulation result obtained when the diameter of the opening part 210A of the magnetic sheet 210 of the power transmission apparatus 200 is optimized.

FIG. 27 is a diagram illustrating a characteristic of power transmission efficiency with respect to a diameter of the opening part 210A of the magnetic sheet 210 of the power transmission apparatus 200.

Seven types of the diameter D1 (see FIG. 24) of the opening part 210A were determined between 18 mm and 30 mm by incrementing 2 mm each, and the determined diameters were simulated. The resulting power transmission efficiencies were as follows. 81.3% at D1=18 mm; 85.7% at D1=20 mm; 88.7% at D1=22 mm (greatest value), 88.4% at D1=24 mm; 85.7% at D1=26 mm; 82.6% at D1=28 mm; 80.3% at D1=30 mm.

As illustrated in FIG. 27, the power transmission efficiency exhibits a characteristic having the greatest value at D1=22 mm.

The magnetic sheet 210 is located between the secondary-side resonant coil 3 and the secondary-side coil 4, and the center of the opening part 210A matches the central axis of the secondary-side resonant coil 3 and the central axis of the secondary-side coil 4. Hence, when the diameter of the opening part 210A is changed, the coupling strength between the secondary-side resonant coil 3 and the secondary-side coil 4 may be changed.

Here, a1 represents a current flowing in the primary-side resonant coil 2, a2 represents a current flowing in the secondary-side resonant coil 3, $\omega$ represents an angular frequency of AC power transmitted from the primary-side resonant coil 2 to the secondary-side resonant coil 3, and $\kappa$ represents a coupling rate between the primary-side resonant coil 2 and the secondary-side resonant coil 3. The coupling rate $\kappa$ indicates a coefficient (nondimensional coefficient) proportional to the coupling coefficient between the primary-side resonant coil 2 and the secondary-side resonant coil 4.

Further, $\Gamma 1$ represents a loss rate of current lost due to resistance and the like in the primary-side resonant coil 2, $\Gamma 2$ represents a loss rate of current lost due to resistance and the like in the secondary-side resonant coil 3, and $\Gamma w$ represents a power transmission rate of a current transmitted from the secondary-side resonant coil 3 to the secondary-side coil 4. The respective loss rates $\Gamma 1$ and $\Gamma 2$ are nondimensional coefficients proportional to an inverse number of a Q value of the corresponding primary-side resonant coil 2 and the secondary-side resonant coil 3, and the power transmission rate $\Gamma w$ is also a nondimensional coefficient.

In the above case, a time change (da2/dt) of the current a2 flowing in the secondary-side resonant coil 3 may be represented by the following equation (1). Note that in the equation (1), i represents an imaginary unit.

$$\frac{da2}{dt} = -i(\omega - i\Gamma 2)a2 + i\kappa a1 - \Gamma wa2 \quad (1)$$

In the above equation (1), the third term ($-\Gamma wa2$) on the right-hand side represents the current transmitted from the secondary-side resonant coil 3 to the secondary-side coil 4.

That is, electric power proportional to the power transmission rate $\Gamma w$ is transmitted from the secondary-side resonant coil 3 to the secondary-side coil 4. Hence, to increase the power transmission rate $\Gamma w$ may indicate to increase the coupling strength between the secondary-side resonant coil 3 and the secondary-side coil 4. Further, to decrease the power transmission rate $\Gamma w$ may indicate to decrease the coupling strength between the secondary-side resonant coil 3 and the secondary-side coil 4.

Further, Pt represents AC power input into the primary-side coil 1, $\Gamma w$ represents power received by the secondary-side coil 4, and the power transmission efficiency $\eta w$ is defined in the following equation (2).

$$\eta w \equiv \frac{Pw}{Pt} = \frac{1}{1+\frac{\Gamma 2}{\Gamma w}\cdot\left[1+\frac{1}{fom^2}\left(1+\frac{\Gamma w}{\Gamma 2}\right)^2\right]} \quad (2)$$

In the above equation (2), fom indicates abbreviation of "figure of merit", which may be represented by the following equation (3).

$$fom = \frac{\kappa}{\sqrt{\Gamma 1 \Gamma 2}} \quad (3)$$

In the above equation (3), loss rates $\Gamma 1$ and $\Gamma 2$ are proportional to inverse numbers of the Q value (Q1) of the primary-side resonant coil 2 and the Q value (Q2) of the secondary-side resonant coil 3, respectively. Hence, fom is the equivalent of the product of the coupling rate $\kappa$ and $(Q1 \cdot Q2)^{1/2}$.

The loss rate $\Gamma 2$ indicates a loss rate of the current in the secondary-side resonant coil 3, and is a fixed value determined based on the Q value (Q2) of the secondary-side resonant coil 3. Hence, the above equation (2) for computing the power transmission efficiency $\eta w$ may be considered as a quadratic equation in which the squared term of the variable $\Gamma w$ is included in the denominator.

Hence, the equation (2) has a greatest value when a certain value is assigned to the power transmission rate $\Gamma w$.

Note that the above equations (1) to (3) are recited in "Efficient wireless non-radiative mid-range energy transfer", Aristeidis Karalis et al. (http://arxiv.org/ftp/physics/papers/0611/0611063.pdf), the Internet search conducted on Jul. 4, 2011.

Figure 28:
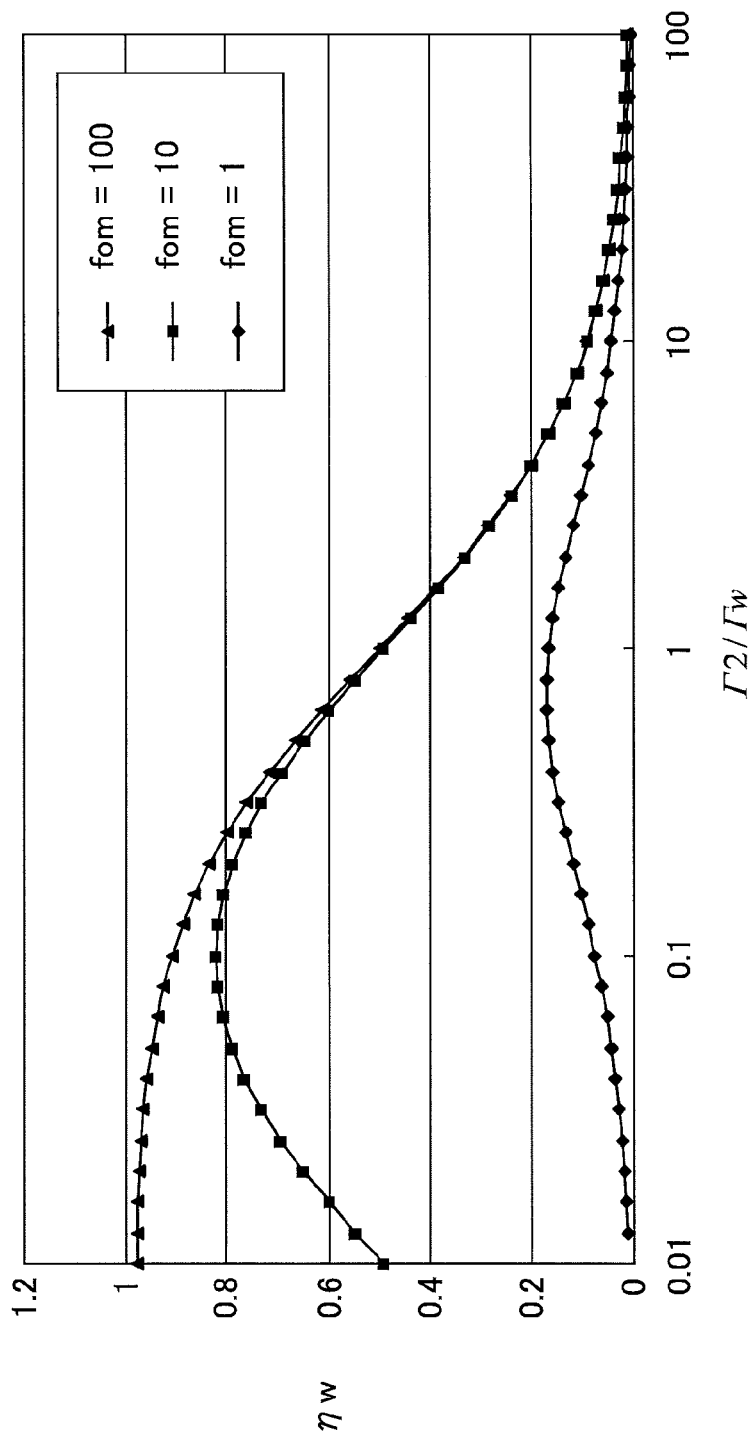
FIG. 28 is a diagram illustrating a characteristic of power transmission efficiency raw with respect to a value represented by (Γ2/Γw)

FIG. 28 is a diagram illustrating a characteristic of the power transmission efficiency $\eta w$ with respect to the value represented by ($\Gamma 2/\Gamma w$) included in the equation (2) when the value of fom is set at 1, 10, and 100. FIG. 28 illustrates a characteristic represented by a semilogarithmic graph where a horizontal axis ($\Gamma 2/\Gamma w$) is plotted on a logarithmic scale.

As described above, the loss rate Γ2 is a value proportional to an inverse number of the Q value (Q2) of the secondary-side resonant coil 3, and is generally considered as a fixed value. Hence, to change the value of (Γ2/Γw) may be implemented by assigning a value of the power transmission rate Γw to the (Γ2/Γw).

The power transmission rate Γw is, as described above, a coefficient that represents a percentage of the current transmitted from the secondary-side resonant coil 3 to the secondary-side coil 4. To increase the power transmission rate Γw indicates to increase the coupling strength between the secondary-side resonant coil 3 and the secondary-side coil 4, whereas to decrease the power transmission rate Γw indicates to decrease the coupling strength between the secondary-side resonant coil 3 and the secondary-side coil 4.

Further, the coupling strength between the secondary-side resonant coil 3 to the secondary-side coil 4 may be increased when the diameter D1 of the opening apart 210A of the magnetic sheet 210 is increased, whereas the coupling strength may be decreased when the diameter D1 of the opening apart 210A of the magnetic sheet 210 is decreased. This is because the greater the diameter D1 of the opening part 210A, the higher the electromagnetic field coupling strength becomes due to an increase in the flux linkages of the secondary-side resonant coil 3 and the secondary-side coil 4.

In FIG. 28, to increase the value (Γ2/Γw) indicates to decrease the power transmission rate Γw included in the denominator. That is, this indicates to decrease the diameter D1 of the opening part 210A so as to lower the coupling strength between the secondary-side resonant coil 3 and the secondary-side coil 4.

By contrast, in FIG. 28, to decrease the value of the (Γ2/Γw) indicates to increase the power transmission rate Γw included in the denominator. That is, this indicates to increase the diameter D1 of the opening part 210A so as to raise the coupling strength between the secondary-side resonant coil 3 and the secondary-side coil 4.

That is, in FIG. 28, the diameter D1 of the opening part 210A of the magnetic sheet 210 is decreased toward a right side of the horizontal axis whereas the diameter D1 of the opening part 210A of the magnetic sheet 210 is increased toward a left side of the horizontal axis.

As illustrated in FIGS. 28, 0.01 to 100 is assigned as the value of the (Γ2/Γw). In a case of fom being one, a characteristic of the power transmission efficiency ηw being the local maximal value (approximately 0.18) when the value of the (Γ2/Γw) is approximately 0.7 is obtained.

Similarly, in a case of fom being ten, a characteristic of the power transmission efficiency ηw being the local maximal value (approximately 0.82) when the value of the (Γ2/Γw) is approximately 0.1 is obtained.

Further, in a case of fom being 100, a characteristic of the power transmission efficiency ηw being the maximal value of approximately 0.98 when the value of the (Γ2/Γw) is approximately 0.01, and the power transmission efficiency ηw decreasing as the value of the (Γ2/Γw) is increased is obtained. In the case of fom being 100, the value of the (Γ2/Γw) for obtaining the local maximal value of the power transmission efficiency ηw is unknown unless a value smaller than 0.01 is assigned as the value of the (Γ2/Γw). However, it is expected based on the characteristics illustrated in FIG. 28 that the local maximal value of the power transmission efficiency ηw may be obtained when the value of the (Γ2/Γw) is approximately 0.01.

As described above, it is clarified that the power transmission efficiency ηw may be optimized by adjusting the diameter D1 of the opening part 210A of the magnetic sheet 210. Further, it is clarified that there is an optimal value of the diameter D1 of the opening part 210A for obtaining the local maximal value of the power transmission efficiency ηw.

Hence, the reason for obtaining the local maximal value (88.7%) of the power transmission efficiency ηw when the diameter D1 of the opening part 210A is 22 mm, as illustrated in FIG. 27, may be that the coupling strength of the secondary-side resonant coil 3 and the secondary-side coil 4 is optimized when the diameter D1 is 22 mm.

Further, when the diameter D1 is larger than 22 mm, the coupling strength of the secondary-side resonant coil 3 and the secondary-side coil 4 may become too high. This may indicate that sufficient magnetic field resonance is yet to be generated between the primary-side resonant coil 2 and the secondary-side resonant coil 3.

By contrast, when the diameter D1 is smaller than 22 mm, the coupling strength of the secondary-side resonant coil 3 and the secondary-side coil 4 may become insufficient. Hence, it is considered that the electric power is not sufficiently propagated from the secondary-side resonant coil 3 and the secondary-side coil 4, such that the power is accumulated in the primary-side resonant coil 2 where the magnetic field resonance is generated and the secondary-side resonant coil 3.

In order to adjust the coupling strength between the secondary-side resonant coil 3 and the secondary-side coil 4, it may be considered to widen an interval (distance) between the secondary-side resonant coil 3 and the secondary-side coil 4, other than disposing the magnetic sheet 210 between the secondary-side resonant coil 3 and the secondary-side coil 4.

However, since the power transmission apparatus 200 of the second embodiment is a jacket type power transmission apparatus for the smartphone terminal 500, widening the interval between the secondary-side resonant coil 3 and the secondary-side coil 4, which results in an increase of the thickness of the jacket, is not a practical solution in view of commercial production.

Hence, as described above, it may be preferable, in view of commercial production, that the power transmission apparatus 200 incorporates the magnetic sheet 210 so as to optimize the power transmission efficiency by optimizing the diameter of the opening part 210A of the magnetic sheet 210 because the increased amount of the thickness of the power transmission apparatus 200 is merely the thickness of the magnetic sheet 210.

As described above, the power transmission apparatus 200 includes the magnetic sheet 210 disposed between the secondary-side resonant coil 3 and the secondary-side coil 4. Accordingly, even if the power transmission apparatus 200 is attached to the smartphone terminal 500 including the secondary-side coil 4 optimized for the electromagnetic induction, electric power may be efficiently transmitted by magnetic field resonance from the power transmitter 10 to the smartphone terminal 500.

Accordingly, by attaching the power transmission apparatus 200 of the second embodiment to the smartphone terminal 500, electric power may be transmitted to the smartphone terminal 500 having the electromagnetic induction type power receiver 20 by magnetic field resonance to charge the battery 9 of the smartphone terminal 500.

According to the second embodiment, in a transitional period where the power transmission system is shifted from the electromagnetic induction type to the magnetic field resonance type, even when a user of the smartphone terminal 500 has moved to a place where only magnetic field resonance type power transmitters are available, the user may be able to receive electric power by magnetic field resonance via the power transmission apparatus 200 so as to charge the battery 9 of the smartphone terminal 500.

Note that the description given above illustrates the example that includes one round opening part 210A or one rectangular opening part 210B being formed in the center of the magnetic sheet 210. However, two or more opening parts may be formed in the magnetic sheet 210. When two or more opening parts are formed in the magnetic sheet 210, the opening parts may be arranged in various patterns. For example, the opening parts may be arranged in a polka-dot pattern.

Further, the description given above illustrates the example that includes the magnetic sheet 210 being disposed closer to the surface 210A (see FIG. 22) attached to the smartphone terminal 500 than the secondary-side resonant coil 3. However, as an alternative to the magnetic sheet 210, a magnetic layer may be formed by mixing magnetic particles in polycarbonate resin at a position closer to the surface 210A than the secondary-side resonant coil 3. In this case, the magnetic layer may be formed in place of the magnetic sheet 210, and the cover part may be formed by layering the formed magnetic layer on a layer made of polycarbonate resin that does not contain the magnetic particles.

Further, the description given above illustrates the example that includes the opening part 210A formed in the magnetic sheet 210. However, the opening part 210A is not necessarily formed in the magnetic sheet 210, provided that the coupling strength between the secondary-side resonant coil 3 and the secondary-side coil 4 is capable of being optimized without forming the opening part 210A.

Moreover, the magnetic sheet 210 may be attached to the surface of the cover part 201. In this case, the magnetic field 210 is not disposed inside the cover part 201 but is disposed on an exterior of the cover part 210.

Further, the description given above illustrates the example in which the secondary-side resonant coil 3 is formed by winding a copper wire. However, in a case where the secondary-side resonant coil 3 is capable of being formed by printing, the secondary-side resonant coil 3 may be printed on the surface of the magnetic sheet 210. Alternatively, the secondary-side resonant coil 3 may be formed by forming a copper foil on the surface of the magnetic sheet 210, and patterning the copper foil.

Third Embodiment

Figure 29:
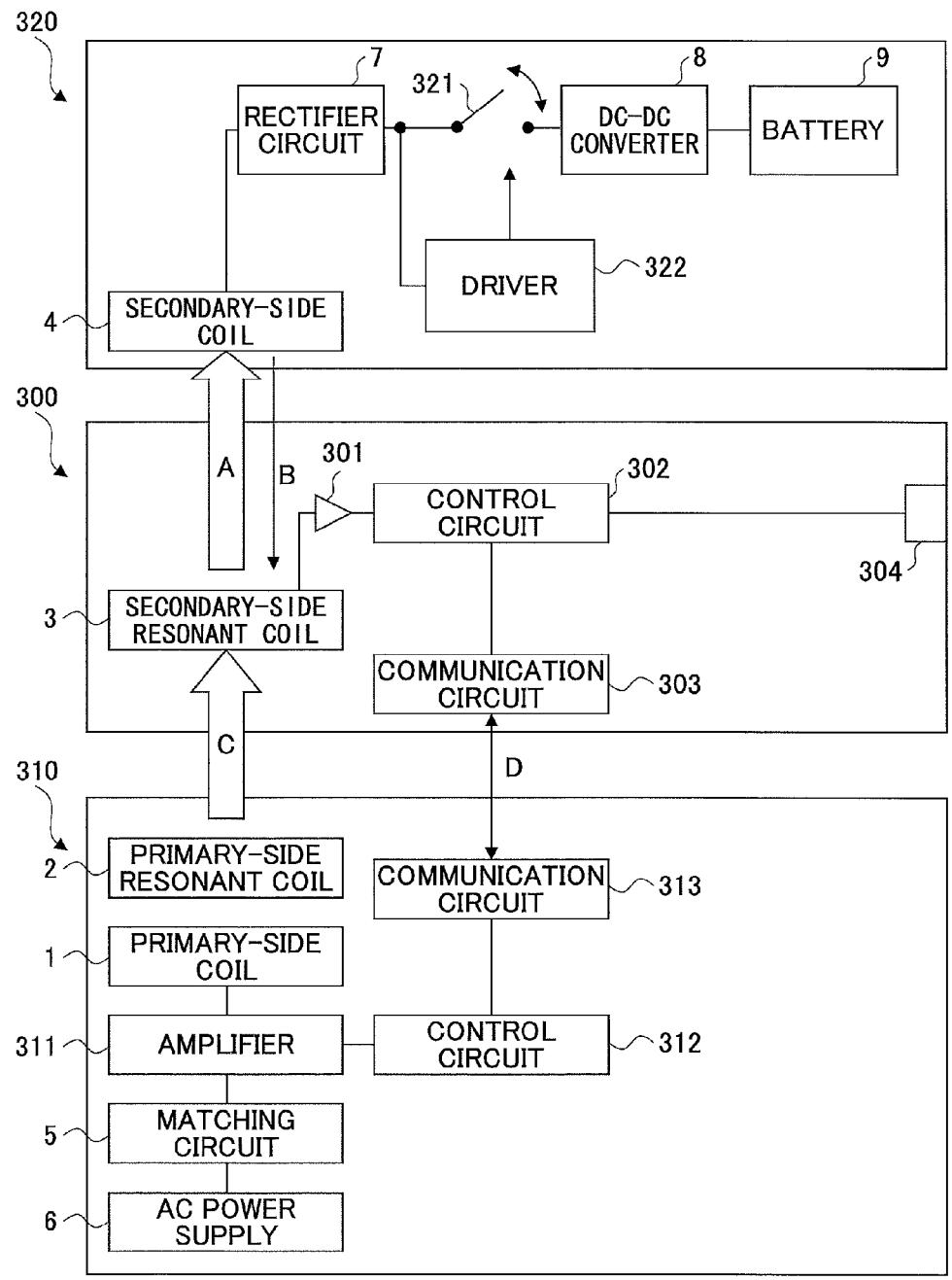
FIG. 29 is a diagram illustrating a power transmission apparatus 300 according to a third embodiment, a power transmitter 310, and a power receiver 320.

FIG. 29 is a diagram illustrating a power transmission apparatus 300 according to a third embodiment, a power transmitter 310, and a power receiver 320.

The power transmission apparatus 300 of the third embodiment differs from the power transmission apparatus 100 of the first embodiment and the power transmission apparatus 200 of the second embodiment in that the power transmission apparatus 300 performs communications associated with electric power. In the following, elements of the power transmission apparatus 300 of the third embodiment that are the same as or equivalent to those of the power transmission apparatus 100 of the first embodiment or the power transmission apparatus 200 of the second embodiment are designated by the same reference numerals, and their descriptions will therefore be omitted from the specification of the present application.

Further, in FIG. 29, some of the elements are illustrated with a block diagram in order to facilitate viewability of electric power transmission and reception or data transmission and reception between the power transmission apparatus 300 of the third embodiment and a power transmitter 310 or a power receiver 320.

The power receiver 320 includes the secondary-side coil 4, the rectifier circuit 7, the DC-DC converter 8, the battery 9, and a switch 321. As illustrated by an arrow A in FIG. 29, electric power is transmitted from the secondary-side resonant coil 3 of the power transmission apparatus 300 by electromagnetic induction.

The switch 321 is inserted between the rectifier circuit 7 and the DC-DC converter 8, and is switched ON/OFF by a drive part 322. The ON/OFF switching of the switch 321 by the drive part 322 is not constantly performed but is performed every time a predetermined time has elapsed. For example, the drive part 322 switches the switch 321 ON/OFF every 30 seconds.

The drive part 322 may, for example, switch the switch 321 ON/OFF by a code representing predetermined load modulation of the Qi standard based on an output voltage of the rectifier circuit 7. Note that the code representing predetermined load modulation of the Qi standard indicates a code representing a voltage value. For example, in a case of three-bit code, the code representing the load modulation may be eight values of '0' or '1' aligned. In this case, when the value of the code is '0', the drive part 322 switches the switch 321 OFF, whereas when the value of the code is '1', the drive part 322 switches the switch 321 ON.

As described above, the code representing the load modulation is set such that the value of the code differs based on the output voltage of the rectifier circuit 7. Note that the third embodiment describes an example that employs the code representing the load modulation. However, other types of codes may be employed in place of the code representing the load modulation insofar as the code may be able to represent the output voltage of the rectifier circuit 7.

The switch 321 may, for example, be formed of a switching element and the like, and switching ON/OFF is performed by the drive part 322. When the ON/OFF of the switch 321 is performed, voltage fluctuation may occur between the battery 9 and the DC-DC converter 8.

For example, in a case where the voltage fluctuation when the switch 321 is ON is 1 V, and the voltage fluctuation when the switch 321 is OFF is 2 V, the switch 321 is OFF when the voltage fluctuation is raised to 2 V. Since the voltage fluctuation occurs based on the value of the code, the code is read by detecting the voltage fluctuation, and a charge level of the battery is detected by reading the code.

The voltage fluctuation representing the code is transmitted to the secondary-side resonant coil 3 via the rectifier circuit 7 and the secondary-side coil 4. The voltage fluctuation is, as illustrated by an arrow B in FIG. 29, transmitted by a so-called in-band signaling system. That is, the voltage fluctuation is transmitted by an in-band signaling system between the secondary-side coil 4 and the secondary-side resonant coil 3 by modulating the power transmitted from the secondary-side resonant coil 3 to the secondary-side coil 4.

As illustrated in FIG. 29, the power transmission apparatus 300 includes the secondary-side resonant coil 3, an amplifier 301, a control circuit 302, a communication circuit 303, and a terminal 304. In FIG. 29, the power transmission apparatus 300 and the secondary-side resonant coil 3 are illustrated in a block diagram.

However, the power transmission apparatus 300 is, similar to the jacket type power transmission apparatus 100 illustrated in FIGS. 3 and 13, a jacket type power transmission apparatus to be attached to the smartphone terminal 500. Further, the secondary-side resonant coil 3 is, similar to the secondary-side resonant coil 3 illustrated in FIG. 3, a coil incorporated in a cover part that is similar to the cover part 101 illustrated in FIG. 3.

The amplifier 301, the control circuit 302, the communication circuit 303, and the terminal 304 are incorporated in a cover part similar to the cover part 101 illustrated in FIG. 3.

As illustrated by an arrow C, electric power is transmitted from the primary-side resonant coil 2 of the power transmitter 310 to the secondary-side resonant coil 3 by magnetic field resonance.

An input terminal of the amplifier 301 connected between two ends of the secondary-side resonant coil 3 so as to receive the voltage fluctuation transmitted from the secondary-side coil 4 of the power receiver 320 to the secondary-side resonant coil 3. An output terminal of the amplifier 301 is connected to the control circuit 302.

The control circuit 302 is configured to convert signals representing the voltage fluctuation input from the amplifier 301 into code data in a data format capable of being communicated between the communication circuits 303 and 313, and output the converted code data to the communication circuit 303.

The communication circuit 303 is configured to transmit the code data input from the control circuit 302 to the communication circuit 313 of the power transmitter 310. Examples of the communication circuit 303 include a circuit capable of communicating in wireless communication standard such as Bluetooth, and a circuit capable of communicating in a proximity communication system such as radio frequency identification (RFID).

The code data may, for example, be transmitted by a so-called out-band signaling system as illustrated by an arrow D in FIG. 29 between the communication circuits 303 and 313. That is, the code data are transmitted by the out-band signaling system between the communication circuits 303 and 313 at a frequency differing from the frequency at which the power is transmitted from the primary-side resonant coil 2 to the secondary-side resonant coil 3.

Note that the terminal 304 is configured to connect an external apparatus to the power transmission apparatus 300 when a computer program such as firmware used in the control circuit 302 or the communication circuit is to be updated. An example of the terminal 304 may include a universal serial bus (USB) formatted terminal.

The power transmitter 310 includes a primary-side coil 1, a primary-side resonant coil 2, a matching circuit 5, an AC power supply 6, an amplifier 311, a control circuit 312, and the communication circuit 313.

The amplifier 311 is disposed between the matching circuit 5 and the primary-side coil 1. The amplifier 311 is controlled by the control circuit 312, and is configured to adjust the amount of electric power supplied from the AC power supply 6 to the primary-side coil 1 via the matching circuit 5.

The control circuit 312 is configured to adjust the amount of electric power output from the amplifier 311 to the primary-side coil 1, based on the code data that the communication circuit 313 receives from the communication circuit 303 of the power transmission apparatus 300.

The communication circuit 313 is configured to receive the code data from the communication circuit 303 of the power transmission apparatus 300. The communication circuit 313 may be configured to perform data communication with a communication format identical to that of the communication circuit 303 of the power transmission apparatus 300. Examples of the communication circuit 313 may include a circuit capable of communicating in wireless communication standard such as Bluetooth (registered trademark), or a circuit capable of communicating in a proximity communication system such as radio frequency identification (RFID).

Since the code data that the communication circuit 313 receives from the communication circuit 303 of the power transmission apparatus 300 indicates a charge level of the battery 9, the control circuit 312 adjusts the amount of electric power to be supplied from the amplifier 311 to the primary-side coil 1 based on the code data.

For example, when the voltage level indicated by the code data is lower than a predetermined reference level, the control circuit 312 increases the amount of electric power supplied from the amplifier 311 to the primary-side coil 1 to charge the battery 9. On the other hand, when the voltage level indicated by the code data is higher than the predetermined reference level, the control circuit 312 decreases the amount of electric power to be supplied from the amplifier 311 to the primary-side coil 1 to charge the battery 9.

Note that, when the voltage level indicated by the code data represents the battery 9 being charged in full, the control circuit 312 sets the amount of electric power to be supplied from the amplifier 311 to the primary-side coil 1 at 0. Note that as for the predetermined reference level, the voltage level corresponding to a state of charge (SOC) of the battery 9 being 90% may be employed as the predetermined level.

Further, when the voltage level indicated by the code data is extremely high, a power transmission status between the secondary-side resonant coil 3 and the secondary-side coil 4 may be considered as being degraded due to the presence of foreign matter and the like between the power transmission apparatus 300 and the power receiver 320, or due to misalignment between the secondary-side resonant coil 3 and the secondary-side coil 4.

Similarly, when the voltage level indicated by the code data is extremely high, a power transmission status between the secondary-side resonant coil 3 and the primary-side resonant coil 2 may be considered as being degraded due to the presence of foreign matter and the like between the power transmission apparatus 300 and the power transmitter 310, or due to misalignment between the secondary-side resonant coil 3 and the primary-side resonant coil 2.

Hence, when a signal level of this signal is extremely high, the control circuit 312 may stop charging the battery 9.

As descried above, by attaching the power transmission apparatus 300 of the third embodiment to the smartphone terminal 500 (see FIGS. 7 and 13), electric power may be transmitted to the smartphone terminal 500 having the electromagnetic induction type power receiver 320 by magnetic field resonance to charge the battery 9 of the smartphone terminal 500.

Further, in this case, it may be possible to adjust the amount of electric power to be transmitted from the power transmitter 310 to the power receiver 320 via the power transmission apparatus 300, based on a charge state of the battery 9.

Moreover, when foreign matter or the like is present between the power transmission apparatus 300 and the power receiver 320, or between the power transmission apparatus 300 and the power transmitter 310, the voltage level indicated by the code data may become extremely high. Likewise, when the secondary-side resonant coil 3 and the secondary-side coil 4 are misaligned, or when the secondary-side resonant coil 3 and the primary-side resonant coil 2 are misaligned, the voltage level indicated by the code data may become extremely high. In such cases, the control circuit 312 may stop charging the battery 9 by setting the output of the amplifier 311 at 0.

Note that the switch 321 may be disposed between the DC-DC converter 8 and the battery 9.

Figure 30:
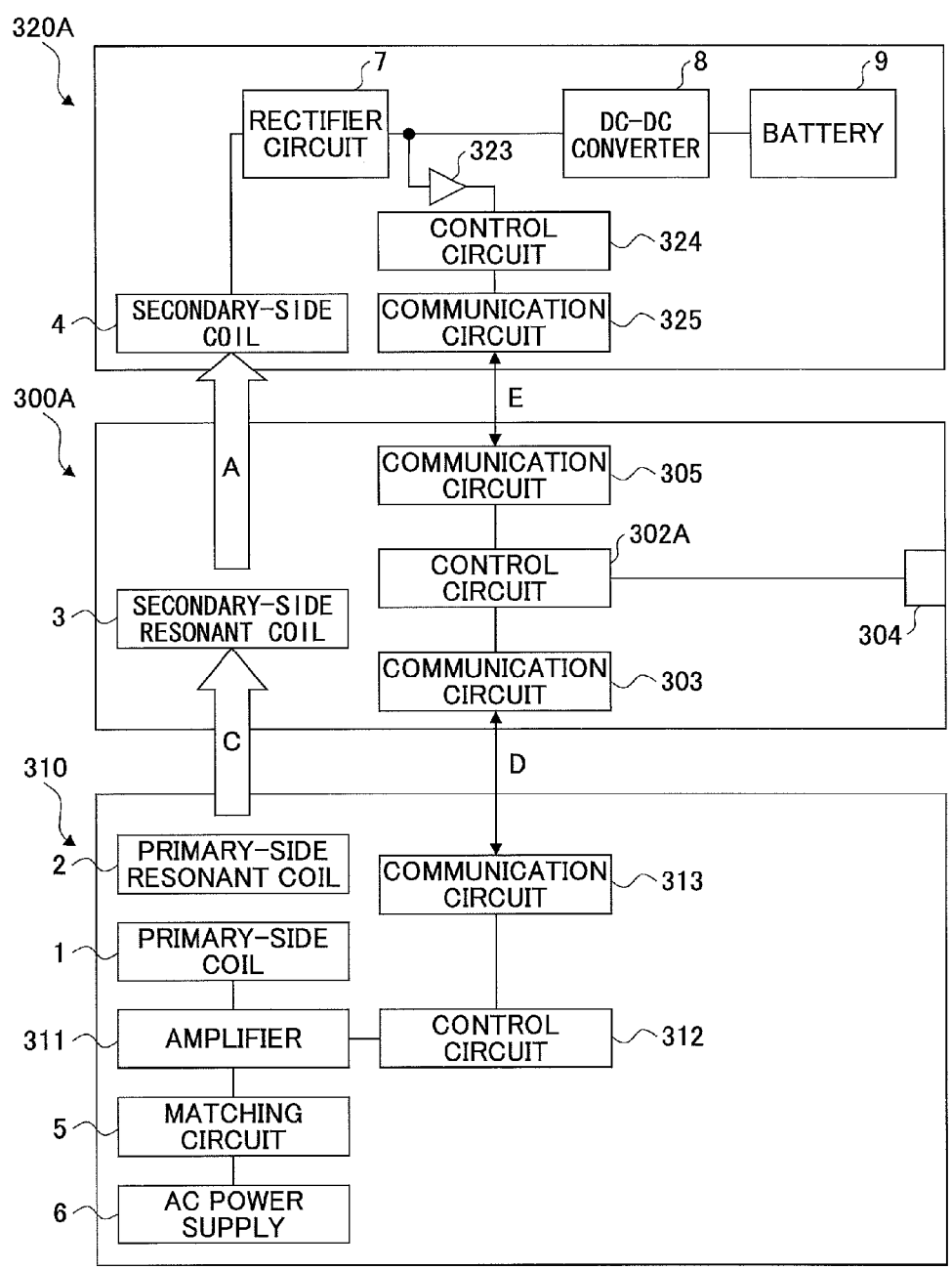
FIG. 30 is a diagram illustrating a power transmission apparatus 300A according to modification of the third embodiment, a power transmitter 310A, and a power receiver 320A.

Next, a description is given, with reference to FIG. 30, of a power transmission apparatus 300A according to modification of the third embodiment.

FIG. 30 is a diagram illustrating a power transmission apparatus 300A according to modification of the third embodiment, the power transmitter 310, and a power receiver 320A. The power transmitter 310 is similar to the power transmitter 310 illustrated in FIG. 29.

The power receiver 320A includes a secondary-side coil 4, a rectifier circuit 7, a DC-DC converter 8, a battery 9, an amplifier 323, a control circuit 324, and a communication circuit 325. The power receiver 320A differs from the power receiver 320 illustrated in FIG. 29 in that the power receiver 320A includes the amplifier 323, the control circuit 324, and the communication circuit 325 without including the switch 321 and the drive part 322.

An input terminal of the amplifier 323 is connected to an output terminal of the rectifier circuit 7 in parallel with the DC-DC converter 8. The amplifier 323 is configured to detect an output voltage of the rectifier circuit 7, and input the detected voltage to the control circuit 324.

The control circuit 324 is configured to convert a voltage value input from the amplifier 323 into a predetermined code, and output the predetermined code to the communication circuit 325 as code data. The above code data may be code data in a data format capable of being communicated between the communication circuits 325 and 305, and may represent an output voltage of the rectifier circuit 7.

The communication circuit 325 is configured to transmit the code data input from the control circuit 324 to the communication circuit 305 of the power transmission apparatus 300A. Examples of the communication circuit 325 include a circuit capable of communicating in wireless communication standard such as Bluetooth, and a circuit capable of communicating in a proximity communication system such as radio frequency identification (RFID).

The code data may, for example, be transmitted by a so-called out-band signaling system as illustrated by an arrow E in FIG. 30 between the communication circuits 325 and 305. That is, the code data are transmitted by the out-band signaling system between the communication circuits 325 and 305 at a frequency differing from the frequency at which the power is transmitted from the secondary-side resonant coil 3 to the secondary-side coil 4.

The power transmission apparatus 300A includes a secondary-side resonant coil 3, a control circuit 302A, a communication circuit 303, a terminal 304, and the communication circuit 305. The power transmission apparatus 300A differs from the power transmission apparatus 300 illustrated in FIG. 29 in that the power transmission apparatus 300A includes the communication circuit 305 without including the amplifier 301. Further, the control circuit 302A of the power transmission apparatus 300A differs from the control circuit 302 illustrated in FIG. 29 in that the control circuit 302A includes, in addition to the functions of the control circuit 302 illustrated in FIG. 29, a function to transmit signals input from the communication circuit 305 to the communication circuit 303.

The code data input from the communication circuit 325 of the power receiver 320A into the communication circuit 305 of the power transmission apparatus 300A are transmitted by the control circuit 302A to the communication circuit 303, and further transmitted to the communication circuit 313 of the power transmitter 310.

The code data received by the communication circuit 313 are input to the control circuit 312, and the input code data are used to adjust the amount of electric power to be supplied from the amplifier 311 to the primary-side coil 1. The adjustment of the electric power to be supplied to the primary-side coil 1 may be performed by causing the control circuit 312 to adjust the output of the amplifier 311, in a manner similar to the adjustment performed by the power transmitter 310 illustrated in FIG. 29.

Note that data communication between the communications circuits 325 and 305 illustrated in FIG. 30 may be performed bidirectionally. Likewise, data communication between the communications circuits 303 and 313 may also be performed bidirectionally.

Hence, data indicating a charge state may be transmitted from the control circuit 312 to the control circuit 324 via the communication circuits 313, 303, 305, and 325 so as to display the transmitted data on a liquid crystal display (LCD) of the touch panel 501 of the smartphone terminal 500 to which the power receiver 320A is attached. As the data indicating a charge state, data indicating as to whether the battery charge is in progress or the battery charge is complete may be used. The above data may, for example, be generated based on the output of the amplifier 311.

According to an aspect of the above-described embodiments, there is provided a power transmission apparatus having a simpler configuration and capable of transmitting power from a magnetic field resonance type power transmitter to an electromagnetic induction type electronic device.

The power transmission apparatus according to the first to the third embodiments are described above; however, these examples are not limited to those examples specifically disclosed as the first to the third embodiments. Various modifications or alterations may be made without departing from the scope of claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present disclosure have been described in detail, it should be understood that various changes, substitutions, and alterations could be made hereto without departing from the spirit and scope of the invention.

What is claimed is:

1. A power transmission apparatus comprising:
a cover part attached to one of a power transmitter and an electronic apparatus, the power transmitter including a primary-side coil connected to an alternating-current power supply and a primary-side resonant coil configured to receive power from the primary-side coil by electromagnetic induction, the electronic apparatus including a secondary-side coil;

a secondary-side resonant coil disposed in the cover part, and configured to transmit to the secondary-side coil the power received from the primary-side resonant coil by magnetic field resonance generated between the primary-side resonant coil and the secondary-side resonant coil;

a voltage fluctuation detecting part configured to detect voltage fluctuation occurring in the secondary-side resonant coil; and a communication part configured to transmit a signal that represents the voltage fluctuation detected by the voltage fluctuation detecting part, wherein the cover part is attached to the electronic apparatus including the secondary-side coil, and the communication part transmits the signal that represents the voltage fluctuation.

2. The power transmission apparatus as claimed in claim 1, wherein a central axis of the secondary-side resonant coil matches a central axis of the secondary-side coil in a state where the cover part is attached to one of the power transmitter and the electronic apparatus.

3. The power transmission apparatus as claimed in claim 1, wherein the cover part is made of a nonmagnetic material.

4. The power transmission apparatus as claimed in claim 1, wherein the cover part is made of a nonconductive material.

5. The power transmission apparatus as claimed in claim 1, further comprising:

a magnetic part made of a magnetic material, the magnetic part being disposed on an internal part or an external part of the cover part.

6. The power transmission apparatus as claimed in claim 5, wherein the magnetic part is disposed on the internal part or the external part of the cover part at a position closer to the secondary-side coil than the secondary-side resonant coil in a state where the cover part is attached to the electronic apparatus.

7. The power transmission apparatus as claimed in claim 5, wherein the magnetic part includes an opening part.

8. The power transmission apparatus as claimed in claim 7, wherein a center of the opening part matches a central axis of the secondary-side resonant coil.

9. The power transmission apparatus as claimed in claim 1, wherein the cover part serves as a jacket of the electronic apparatus.

* * * * *